(12) United States Patent
Brookfield

(10) Patent No.: US 11,048,772 B2
(45) Date of Patent: *Jun. 29, 2021

(54) TAILORED MESSAGING

(71) Applicant: TRADING TECHNOLOGIES INTERNATIONAL INC., Chicago, IL (US)

(72) Inventor: Bevan Jacob Brookfield, Evanston, IL (US)

(73) Assignee: Trading Technologies International, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/849,453

(22) Filed: Apr. 15, 2020

(65) Prior Publication Data
US 2020/0242176 A1 Jul. 30, 2020

Related U.S. Application Data

(63) Continuation of application No. 14/329,602, filed on Jul. 11, 2014, now Pat. No. 10,664,548.
(Continued)

(51) Int. Cl.
G06F 16/957 (2019.01)
G06F 16/23 (2019.01)
(Continued)

(52) U.S. Cl.
CPC ............ *G06F 16/957* (2019.01); *G06F 16/23* (2019.01); *G06Q 40/04* (2013.01)

(58) Field of Classification Search
CPC ........ G06F 16/957; G06F 16/23; G06Q 40/04
See application file for complete search history.

(56) References Cited

U.S. PATENT DOCUMENTS 3,253,263 A 5/1966 Lee et al.
3,962,685 A 6/1976 Belle Isle
(Continued)

FOREIGN PATENT DOCUMENTS

CN 101617334 A 12/2009
CN 101675448 A 3/2010
(Continued)

OTHER PUBLICATIONS

"Bristol Releases Enterprise Transaction Monitor," Midrange Stuff, http://www.midrangeserver.com/mso021902-story04.html, printed Feb. 19, 2002.
(Continued)

*Primary Examiner* — Christopher B Robinson

(57) ABSTRACT

The disclosed embodiments generally relate to techniques for tailoring messages for network communication. More specifically, the disclosed embodiments relate to systems and methods to provide customized information updates based on recipient preferences. For example, a recipient may prefer receiving updates less frequently than the system creates updates and/or may prefer to receive different levels of data in the updates. In some embodiments, a deltasnap technique is provided which allows for more efficient tailoring of the rate that update messages are provided. In some embodiments, a partitioning technique is provided which allows for more efficient tailoring of the content of update messages. In some embodiments, the deltasnap technique is provided in combination with the partitioning technique which allows for more efficient tailoring of the rate and content of the update messages.

8 Claims, 21 Drawing Sheets

Related U.S. Application Data

(60) Provisional application No. 61/845,613, filed on Jul. 12, 2013, provisional application No. 62/022,736, filed on Jul. 10, 2014.

(51) Int. Cl.
 *H04L 12/26* (2006.01)
 *G06Q 40/04* (2012.01)

(56) References Cited

U.S. PATENT DOCUMENTS

| | | |
|---|---|---|
| 4,412,287 A | 10/1983 | Braddock, III |
| 4,677,552 A | 6/1987 | Sibley |
| 4,692,600 A | 9/1987 | Takahashi |
| 4,740,958 A | 4/1988 | Duxbury et al. |
| 4,868,866 A | 6/1989 | Williams, Jr. |
| 4,903,201 A | 2/1990 | Wagner |
| 4,980,826 A | 12/1990 | Wagner |
| 4,995,056 A | 2/1991 | Fogg, Jr. et al. |
| 5,077,665 A | 12/1991 | Silverman et al. |
| 5,136,501 A | 8/1992 | Silverman et al. |
| 5,297,031 A | 3/1994 | Gutterman et al. |
| 5,297,032 A | 3/1994 | Trojan et al. |
| 5,339,392 A | 8/1994 | Risberg et al. |
| 5,515,359 A | 5/1996 | Zheng |
| 5,522,037 A | 5/1996 | Kitagawa et al. |
| 5,604,866 A | 2/1997 | Kolb et al. |
| 5,680,116 A | 10/1997 | Hashimoto et al. |
| 5,727,165 A | 3/1998 | Ordish et al. |
| 5,790,642 A | 8/1998 | Taylor et al. |
| 5,802,310 A | 9/1998 | Rajaraman |
| 5,826,244 A | 10/1998 | Huberman |
| 5,905,868 A | 5/1999 | Baghai et al. |
| 5,911,137 A | 6/1999 | Lin et al. |
| 5,916,307 A | 6/1999 | Piskiel et al. |
| 5,924,083 A | 7/1999 | Silverman et al. |
| 5,953,708 A | 9/1999 | Midorikawa et al. |
| 5,995,980 A | 11/1999 | Olson et al. |
| 6,006,206 A | 12/1999 | Smith et al. |
| 6,039,245 A | 3/2000 | Symonds et al. |
| 6,058,389 A | 5/2000 | Chandra et al. |
| 6,073,180 A | 6/2000 | Onoda et al. |
| 6,097,399 A | 8/2000 | Bhatt et al. |
| 6,144,669 A | 11/2000 | Williams et al. |
| 6,167,445 A | 12/2000 | Gai et al. |
| 6,192,029 B1 | 2/2001 | Averbuch et al. |
| 6,260,025 B1 | 7/2001 | Silverman et al. |
| 6,269,399 B1 | 7/2001 | Dyson et al. |
| 6,278,982 B1 | 8/2001 | Korhammer et al. |
| 6,311,144 B1 | 10/2001 | Abu El Ata |
| 6,338,047 B1 | 1/2002 | Wallman |
| 6,343,278 B1 | 1/2002 | Jain et al. |
| 6,370,569 B1 | 4/2002 | Austin |
| 6,389,016 B1 | 5/2002 | Sabaa et al. |
| 6,408,000 B1 | 6/2002 | Lamberg et al. |
| 6,421,653 B1 | 7/2002 | May et al. |
| 6,516,339 B1 | 2/2003 | Potts, Jr. et al. |
| 6,553,035 B1 | 4/2003 | Schwartz et al. |
| 6,574,234 B1 | 6/2003 | Myer et al. |
| 6,606,607 B1 | 8/2003 | Martin et al. |
| 6,675,153 B1 | 1/2004 | Cook et al. |
| 6,772,132 B1 | 8/2004 | Kemp, II et al. |
| 6,973,623 B2 | 12/2005 | Little et al. |
| 6,993,507 B2 | 1/2006 | Meyer et al. |
| 7,069,551 B2 | 6/2006 | Fong et al. |
| 7,124,110 B1 | 10/2006 | Kemp, II et al. |
| 7,127,424 B2 | 10/2006 | Kemp, II et al. |
| 7,130,824 B1 | 10/2006 | Amanat et al. |
| 7,133,460 B2 | 11/2006 | Bae et al. |
| 7,167,923 B2 | 1/2007 | Lo |
| 7,212,997 B1 | 5/2007 | Pine et al. |
| 7,222,096 B2 | 5/2007 | Anaya et al. |
| 7,305,483 B2 | 12/2007 | Yao et al. |
| 7,310,615 B2 | 12/2007 | Lewis |
| 7,318,045 B2 | 1/2008 | Baecker et al. |
| 7,366,691 B1 | 4/2008 | Kemp, II et al. |
| 7,389,268 B1 | 6/2008 | Kemp, II et al. |
| 7,392,219 B2 | 6/2008 | Singer et al. |
| 7,398,244 B1 | 7/2008 | Keith |
| 7,412,462 B2 | 8/2008 | Margolus et al. |
| 7,426,491 B1 | 9/2008 | Singer et al. |
| 7,454,382 B1 | 11/2008 | Triplett |
| 7,552,077 B1 | 6/2009 | Schluetter et al. |
| 7,562,044 B1 | 7/2009 | Tenorio |
| 7,567,927 B2 | 7/2009 | Boglaev |
| 7,567,930 B1 | 7/2009 | Schluetter et al. |
| 7,599,867 B1 | 10/2009 | Monroe et al. |
| 7,680,721 B2 | 3/2010 | Cutler |
| 7,685,049 B1 | 3/2010 | Singer |
| 7,685,055 B2 | 3/2010 | Brumfield et al. |
| 7,742,962 B1 | 6/2010 | Singer |
| 7,752,123 B2 | 7/2010 | Brookfield et al. |
| 7,783,546 B2 | 8/2010 | Saulys et al. |
| 7,783,558 B1 | 8/2010 | Schwarz et al. |
| 7,783,559 B1 | 8/2010 | Schwarz et al. |
| 7,797,207 B1 | 9/2010 | Dilip et al. |
| 7,809,841 B1 | 10/2010 | Crouch |
| 7,827,091 B2 | 11/2010 | Cutler et al. |
| 7,835,972 B2 | 11/2010 | Almeida et al. |
| 7,882,018 B2 | 2/2011 | Schwarz et al. |
| 7,890,415 B1 | 2/2011 | Keith |
| 7,908,204 B2 | 3/2011 | Boglaev |
| 7,970,697 B2 | 6/2011 | Schwarz et al. |
| 7,991,847 B2 | 8/2011 | Cadoret et al. |
| 8,010,679 B2 | 8/2011 | Low et al. |
| 8,069,402 B2 | 11/2011 | Myers et al. |
| 8,082,304 B2 | 12/2011 | Ho et al. |
| 8,090,637 B2 | 1/2012 | Schluetter et al. |
| 8,090,645 B1 | 1/2012 | Silverman et al. |
| 8,090,839 B2 | 1/2012 | Kumar et al. |
| 8,229,823 B2 | 7/2012 | Schluetter et al. |
| 8,230,056 B2 | 7/2012 | Bishop et al. |
| 8,249,975 B1 | 8/2012 | Keith |
| 8,301,546 B2 | 10/2012 | Schwarz et al. |
| 8,332,354 B1 | 12/2012 | Chatterjee et al. |
| 8,352,344 B2 | 1/2013 | Schluetter et al. |
| 8,417,618 B2 | 4/2013 | Milne et al. |
| 8,423,373 B2 | 4/2013 | Singer |
| 8,468,082 B2 | 6/2013 | Doornebos et al. |
| 8,468,199 B2 | 6/2013 | Tomkow |
| 8,489,496 B2 | 7/2013 | Angle et al. |
| 8,571,979 B1 | 10/2013 | Schluetter et al. |
| 8,583,541 B2 * | 11/2013 | Schwarz ............ G06Q 40/00 705/37 |
| 8,589,948 B2 | 11/2013 | Kemp, II et al. |
| 10,565,646 B2 * | 2/2020 | Brookfield ............ G06Q 40/04 |
| 2001/0041579 A1 | 11/2001 | Smith et al. |
| 2001/0042040 A1 | 11/2001 | Keith |
| 2001/0042041 A1 | 11/2001 | Moshal et al. |
| 2001/0044767 A1 | 11/2001 | Madoff et al. |
| 2001/0049649 A1 | 12/2001 | Baecker et al. |
| 2002/0013753 A1 | 1/2002 | Marks De Chabris et al. |
| 2002/0019795 A1 | 2/2002 | Madoff et al. |
| 2002/0026528 A1 | 2/2002 | Lo |
| 2002/0082967 A1 | 6/2002 | Kaminsky et al. |
| 2002/0095369 A1 | 7/2002 | Kaplan et al. |
| 2002/0097697 A1 | 7/2002 | Bae et al. |
| 2002/0111922 A1 | 8/2002 | Young |
| 2002/0120546 A1 | 8/2002 | Zajac |
| 2002/0138399 A1 | 9/2002 | Hayes et al. |
| 2002/0143981 A1 | 10/2002 | Delima et al. |
| 2002/0152446 A1 | 10/2002 | Fleming |
| 2002/0184237 A1 | 12/2002 | McFeely |
| 2003/0004859 A1 | 1/2003 | Shaw et al. |
| 2003/0069834 A1 | 4/2003 | Cutler |
| 2003/0083977 A1 | 5/2003 | Syed et al. |
| 2003/0172091 A1 | 9/2003 | Norcot |
| 2003/0204585 A1 | 10/2003 | Yao et al. |
| 2003/0225674 A1 | 12/2003 | Hughes, Jr. et al. |
| 2004/0019554 A1 | 1/2004 | Merold et al. |
| 2004/0153390 A1 | 8/2004 | Saulys et al. |
| 2004/0162772 A1 | 8/2004 | Lewis |
| 2004/0225592 A1 | 11/2004 | Churquina |
| 2005/0091148 A1 | 4/2005 | Rotondo |

(56) References Cited

U.S. PATENT DOCUMENTS

| | | | |
|---|---|---|---|
| 2005/0228743 A1 | 10/2005 | Warsaw et al. | |
| 2005/0243722 A1 | 11/2005 | Liu et al. | |
| 2005/0283415 A1 | 12/2005 | Studnitzer et al. | |
| 2006/0069635 A1 | 3/2006 | Ram et al. | |
| 2006/0080227 A1 | 4/2006 | Boglaev | |
| 2006/0259414 A1 | 11/2006 | Singer et al. | |
| 2006/0265305 A1 | 11/2006 | Schluetter et al. | |
| 2006/0265314 A1 | 11/2006 | Singer et al. | |
| 2007/0192230 A1 | 8/2007 | Meacham et al. | |
| 2007/0226730 A1 | 9/2007 | Coyle et al. | |
| 2008/0082142 A1 | 4/2008 | Clark et al. | |
| 2008/0155009 A1* | 6/2008 | Jensen | G06Q 40/06 709/202 |
| 2008/0162324 A1 | 7/2008 | West | |
| 2008/0248876 A1 | 10/2008 | Adiraju et al. | |
| 2008/0281669 A1* | 11/2008 | Pratt | G06Q 40/04 705/7.35 |
| 2009/0135723 A1 | 5/2009 | Davidson et al. | |
| 2009/0240633 A1 | 9/2009 | Schluetter et al. | |
| 2009/0322518 A1 | 12/2009 | Liang et al. | |
| 2010/0082542 A1 | 4/2010 | Feng et al. | |
| 2010/0100475 A1 | 4/2010 | Callaway et al. | |
| 2010/0100830 A1 | 4/2010 | Singer | |
| 2010/0121757 A1 | 5/2010 | McNicholas | |
| 2010/0211529 A1 | 8/2010 | Neri | |
| 2010/0274705 A1 | 10/2010 | Schwarz et al. | |
| 2010/0318673 A1 | 12/2010 | Kemp, II et al. | |
| 2011/0016123 A1 | 1/2011 | Pandey et al. | |
| 2011/0040668 A1 | 2/2011 | Lee et al. | |
| 2011/0060677 A1 | 3/2011 | Almeida et al. | |
| 2011/0093381 A1 | 4/2011 | Schwarz et al. | |
| 2011/0196778 A1 | 8/2011 | Vinokour et al. | |
| 2011/0218904 A1 | 9/2011 | Schwarz et al. | |
| 2011/0225448 A1 | 9/2011 | Morosan et al. | |
| 2011/0251942 A1 | 10/2011 | Rosenthal et al. | |
| 2011/0252208 A1 | 10/2011 | Ali et al. | |
| 2012/0011046 A1 | 1/2012 | Nalbandian et al. | |
| 2012/0072325 A1 | 3/2012 | Schluetter et al. | |
| 2012/0095898 A1 | 4/2012 | Kaminsky et al. | |
| 2012/0203687 A1 | 8/2012 | Schwarz et al. | |
| 2012/0221462 A1 | 8/2012 | De Verdier | |
| 2012/0254221 A1 | 10/2012 | Lai et al. | |
| 2012/0259767 A1 | 10/2012 | Schluetter et al. | |
| 2012/0290685 A1 | 11/2012 | Garza et al. | |
| 2012/0311089 A1 | 12/2012 | Reed et al. | |
| 2012/0317011 A1 | 12/2012 | Duquette | |
| 2013/0030977 A1 | 1/2013 | Andrews | |
| 2013/0060887 A1 | 3/2013 | Bradnick et al. | |
| 2013/0085923 A1 | 4/2013 | Schluetter | |
| 2013/0110693 A1* | 5/2013 | Genetski | G06Q 40/06 705/35 |
| 2013/0211997 A1 | 8/2013 | Singer | |
| 2014/0164202 A1 | 6/2014 | Singer | |
| 2014/0351113 A1 | 11/2014 | Jensen et al. | |
| 2015/0019618 A1 | 1/2015 | Brookfield | |

FOREIGN PATENT DOCUMENTS

| | | |
|---|---|---|
| JP | H7-84728 A | 3/1995 |
| JP | 2002-278862 A | 9/2002 |
| JP | 2008-503839 A | 2/2008 |
| JP | 2010-514033 A | 4/2010 |
| WO | 1999/27476 A2 | 6/1999 |
| WO | 2001/77957 A1 | 10/2001 |
| WO | 2002/017193 A1 | 2/2002 |
| WO | 2002/050747 A1 | 6/2002 |
| WO | 2006/000991 A1 | 1/2006 |
| WO | 2008/042111 A2 | 4/2008 |
| WO | 2008/140950 A2 | 11/2008 |

OTHER PUBLICATIONS

Extended European Search Report in European Patent Application No. 14823358.8 dated Jan. 19, 2017, dated Jan. 26, 2017.
"Financial Messaging Middleware," Solid Data, wysiwyg://310/ http://www.soliddata.com/companylbroker_case.html, printed Jul. 11, 2002.
Amir, Y., "Distributed Systems 600.437 Multicast Protocols," The Johns Hopkins University, Baltimore, Maryland, USA, 2010, 16 pages.
Bradshaw et al., "Oracle 9i Application Developer's Guide—Advanced Queuing, Release 2 (9.2)," Oracle Corporation, [Online] Retrieved from the Internet on Nov. 2, 2005: http://www.oracle.com, pp. I-XXII, 1.1-1.28, 7.1-7.16, 18-1-18.48 (Mar. 2002).
Chockler, G.V., "An Implementation of Reliable Multicast Services in the Transis Group Communication System," Lab Project, The Hebrew University of Jerusalem, Jerusalem, Israel, Oct. 5, 1997, 31 pages.
Dolev, D., "The Transis Approach to High Availability Cluster Communication," Communications of the ACM, Apr. 1996, vol. 39, 13 pages.
Extended European Search Report in European Patent Application No. 19156431.9 dated Sep. 17, 2019, dated Sep. 25, 2019.
Gemmell, J., et al., "In Search of an API for Scalable Reliable Multicast," Technical Report MSR-TR-97-17, Microsoft Corporation, Jun. 23, 1997, pp. 1-14.
Guerraoui, R., et al., "Total Order Multicast to Multiple Groups," Proceedings of the 17th IEEE International Conference on Distributed Computing Systems, Baltimore, Maryland, USA, May 27-30, 1997, IEEE Computer Society, 1997, 9 pages.
International Search Report for International Application PCT/US03/21776 dated Sep. 5, 2003.
International Search Report and Written Opinion of International Application No. PCT/US2012/053169, dated Jan. 15, 2013 (dated Jan. 22, 2013).
International Search Report and Written Opinion of International Application No. PCT/US2014/046486, dated Jan. 7, 2015 (dated Jan. 21, 2015).
IWAY Intelligent Adapter for Swift product literature, iWay Software. Printed Feb. 24, 2003.
Koifman, A., et al., "RAMP: A Reliable Adaptive Multicast Protocol," ASC, Inc., 1996, 27 pages.
Koifman, A., et al., "RAMP: A Reliable Adaptive Multicast Protocol," Proceedings of the INFOCOM 1996, 151h Annual Joint Conference of the IEEE Computer Societies, San Francisco, California, USA, Mar. 24-28, 1996, IEEE Computer Society, 1996, 16 pages.
Microsoft Computer Dictionary, Microsoft Press, 5th Ed., 2002, p. 518.
Paul, et al. "Course 24: OpenGL and Window System Integration" Presented at Special Interest Group on Graphics and Interactive Techniques (SIGGRAPH), Los Angeles, Aug. 3-8, 1997. http://www.siggraph.org/s97/conference/courses/24.html.
Rachlevsky-Reich, et al., "GEM: A Global Electronic Market System," [Online] Retrieved from the Internet on Nov. 2, 2005: http//citeseer.ist.psu.edu/rd/80691485, Ch. 3—A Generic Market Framework, pp. 1-125 (Jul. 1999).
Sabata, B., et al., "Transport Protocol for Reliable Multicast: TRM," Proceedings of the International Conference on Networks, Jan. 8-10, 1996, Orlando, Florida, USA, 1996, 3 pages.
Singapore Application No. 11201600229W, Search Report and Written Opinion dated Aug. 30, 2016 (10 Pages).
Singapore Application No. 11201600229W, Written Opinion dated Jun. 19, 2017 (6 Pages).
Speakman, T., et al., "PGM Reliable Transport Specification," Network Working Group, Request for Comments No. 3208, The Internet Society, 2001, 112 pages.
Steiert, et al., "JPMQ—an advanced persistent message queuing service," Advances in Databases. British National Conference on Databases, pp. 1-18 (Jul. 6, 1998).
Supplementary European Search Report EP 03764538, dated Nov. 2, 2005.

(56) References Cited

OTHER PUBLICATIONS

Taylor, P., "Second Quarter Sales Surge but Competition Depresses Margins" [online], Financial Times, London, United Kingdom, Jul. 28, 1998, p. 4. [Retrieved on Aug. 28, 2008] from the Internet: http://proquest.umi.com/, ProQuest Document ID: 32380156.

\* cited by examiner

SNAPSHOT TECHNIQUE

DELTA TECHNIQUE

DELTASNAP TECHNIQUE

SNAPSHOT

DELTASNAP

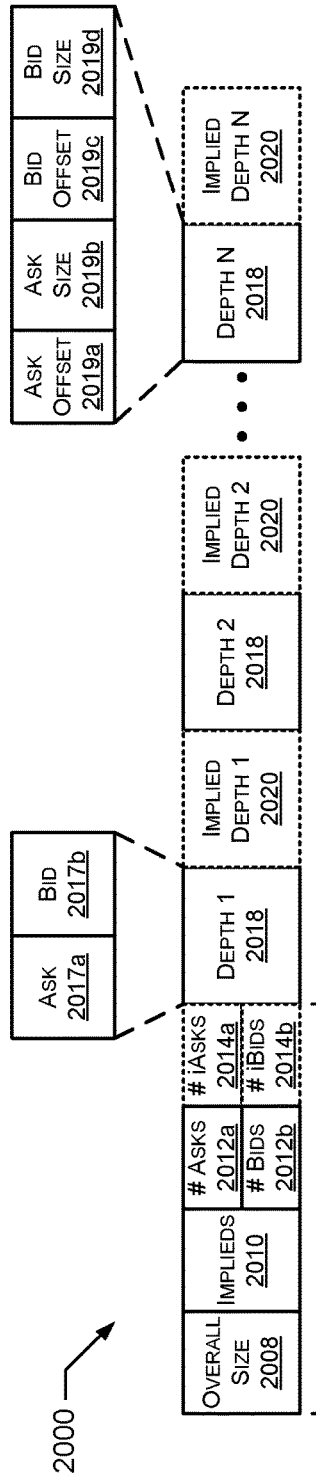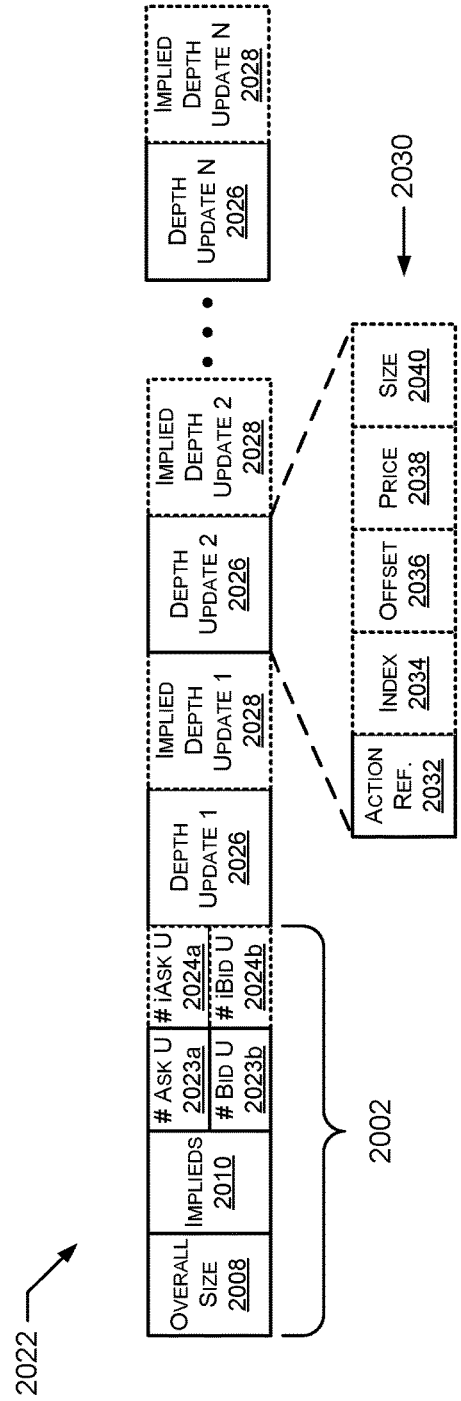
SNAPSHOT
FIG. 20A
DELTASNAP
FIG. 20B

TAILORED MESSAGING

CROSS REFERENCE TO RELATED APPLICATIONS

The present application is a continuation of U.S. patent application Ser. No. 14/329,602, filed Jul. 11, 2014, now U.S. Pat. No. 10,664,548, which claims the priority benefit of U.S. Provisional Patent Application No. 61/845,613, filed Jul. 12, 2013, and entitled "System and Method for Dynamically Distributing Market Data Across Multiple Devices in an Electronic Trading Environment," and claims the priority benefit of U.S. Provisional Patent Application No. 62/022,736, filed Jul. 10, 2014, and entitled "System and Method for Dynamically Distributing Market Data Across Multiple Devices in an Electronic Trading Environment." The contents of each of the foregoing applications are herein fully incorporated by reference in their entirety for all purposes.

BACKGROUND

Electronic devices may exchange data messages to provide up-to-date information regarding, for example, the state of a device. In some systems, multiple recipients are interested in receiving updates from a data source. Techniques such as broadcast or multicast messaging may be used by the data source to provide these updates in certain types of networks. In other systems, some recipients may communicate with the data source using point-to-point connections because of, for example, network limitations, communication preferences (e.g., reliable delivery, ordering, etc.), and/or security requirements.

Some recipients may prefer to receive updates from the same data source at different rates. Providing updates at different rates while minimizing sending undesired messages to recipients limits the usefulness of broadcast or multicast messaging techniques and, as the number of recipients with different update rate preferences increases, point-to-point connections become more effective. However, with point-to-point connections, a message must be generated for each recipient. Additionally, some recipients may prefer to receive different levels or tiers of data in their updates. Customizing messages based on different levels or tiers of data requires generating different messages for each level or tier of data. As the number of recipients with different preferences grows, accommodating different update rates and different levels or tiers of data becomes cumbersome, especially for time-sensitive information where increased latency in receiving the data is not acceptable.

BRIEF DESCRIPTION OF THE FIGURES

Certain embodiments are disclosed with reference to the following drawings.

FIGS. 20A and 20B illustrate example tailorable messages for a snapshot and a deltasnap to provide market data at a number of data levels of market depth.

Figure 1:
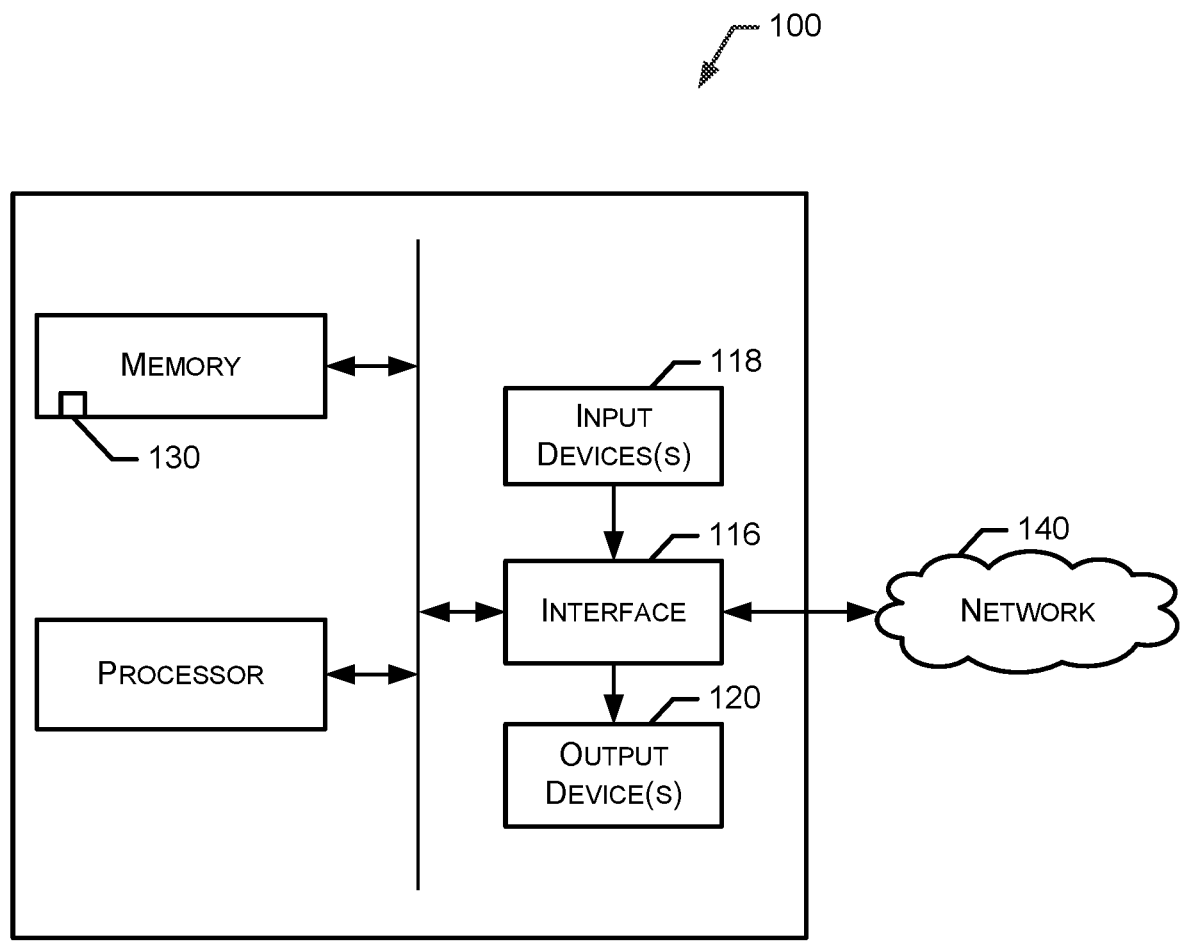
FIG. 1 illustrates a block diagram of an example computing device which may be used to implement certain embodiments.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments generally relate to techniques for tailoring messages for network communication. More specifically, the disclosed embodiments relate to systems and methods to efficiently provide customized information updates based on recipient preferences. For example, a recipient may prefer receiving updates less frequently than the system creates updates and/or may prefer to receive different levels of data in the updates. In some embodiments, a deltasnap technique is provided which allows for more efficient tailoring of the rate that update messages are provided. In some embodiments, a partitioning technique is provided which allows for more efficient tailoring of the content of update messages. In some embodiments, the deltasnap technique is provided in combination with the partitioning technique which allows for more efficient tailoring of the rate and content of the update messages.

Data messages provide information to recipients in a variety of contexts. Some recipients may be interested in receiving updates at a different rate than other recipients. For example, a first recipient may desire to receive updates at a first rate, perhaps the rate at which the updates are being generated, such as up to once per millisecond. A second recipient may be bandwidth constrained and therefore want to be sent updates at a lower rate, such as twice per second. A third recipient may sometimes be bandwidth constrained, and wish to reliably receive updates at whatever rate is possible, without ever receiving out of date data, or experiencing large gaps due to connection resets. Additionally, in some systems, a data source may provide different levels or tiers of data in the updates. For example, each successive level may include values that indicate more detail or additional information beyond the detail provided at prior levels. Some recipients may be interested in receiving different numbers of levels of data in the updates from the data source. For example, a first recipient may be interested in receiving updates for values at the first five levels. A second recipient may be interested in receiving updates for values at the first two levels. To provide different levels of data, messages are tailored according to recipient's preferences. In current systems, accommodating recipient preferences such as update rate and/or different numbers of data levels requires unique messages to be formatted based on the source data for each recipient.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Example methods, systems and computer readable media are disclosed to tailor messages for network communication. An example method for tailoring messages includes generating, by a computing device, a first snapshot message representing a state of a data source at a first time. The first snapshot message is sent to a first recipient. The example method includes generating, by the computing device, a first deltasnap message representing a difference in a state of the data source at a second time and the state of the data source at the first time, and sending, by the computing device, the first deltasnap message to the first recipient.

An example method includes generating, by a computing device, a first snapshot representative of a first set of data captured at a first time. The example method also includes sending, by the computing device, a first version of the first snapshot to a first subscribing device. The first version of the first snapshot is tailored according to a first preference of the first subscribing device. The example method includes generating, by the computing device, a first deltasnap representative of a difference between the first set of data and a second set of data. The second set of data represents data generated at a second time after the first time. The example method includes sending, by the computing device, a first version of the first deltasnap to the first subscribing device. The first version of the first deltasnap is tailored according to the first preference of the first subscribing device.

An example tangible computer readable storage medium includes instructions that, when executed cause a machine to at least generate a first snapshot message representing a state of a data source at a first time. The example instructions cause the machine to send the first snapshot message to a first recipient. The example instructions cause the machine to generate a first deltasnap message representing a difference in a state of the data source at a second time and the state of the data source at the first time. The example instructions cause the send the first deltasnap message to the first recipient.

II. Example Computing Device

FIG. 1 illustrates a block diagram of an example computing device 100 which may be used to implement certain embodiments. The computing device 100 includes a communication network 110, a processor 112, a memory 114, an interface 116, an input device 118, and an output device 120. The computing device 100 may include additional, different, or fewer components. For example, multiple communication networks, multiple processors, multiple memory, multiple interfaces, multiple input devices, multiple output devices, or any combination thereof, may be provided. As another example, the computing device 100 may not include an input device 118 or output device 120.

As shown in FIG. 1, the computing device 100 may include a processor 112 coupled to a communication network 110. The communication network 110 may include a communication bus, channel, electrical or optical network, circuit, switch, fabric, or other mechanism for communicating data between components in the computing device 100. The communication network 110 may be communicatively coupled with and transfer data between any of the components of the computing device 100.

The processor 112 may be any suitable processor, processing unit, or microprocessor. The processor 112 may include one or more general processors, digital signal processors, application specific integrated circuits, field programmable gate arrays, analog circuits, digital circuits, programmed processors, and/or combinations thereof, for example. The processor 112 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 100 is a multi-processor system and, thus, may include one or more additional processors which are communicatively coupled to the communication network 110.

The processor 112 may be operable to execute logic and other computer readable instructions encoded in one or more tangible media, such as the memory 114. As used herein, logic encoded in one or more tangible media includes instructions which may be executable by the processor 112 or a different processor. The logic may be stored as part of software, hardware, integrated circuits, firmware, and/or micro-code, for example. The logic may be received from an external communication device via a communication network such as the network 140. The processor 112 may execute the logic to perform the functions, acts, or tasks illustrated in the figures or described herein.

The memory 114 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 114 may include any desired type of mass storage device including hard disk drives, optical media, magnetic tape or disk, etc.

The memory 114 may include one or more memory devices. For example, the memory 114 may include local memory, a mass storage device, volatile memory, non-volatile memory, or a combination thereof. The memory 114 may be adjacent to, part of, programmed with, networked with, and/or remote from processor 112, so the data stored in the memory 114 may be retrieved and processed by the processor 112, for example. The memory 114 may store instructions which are executable by the processor 112. The instructions may be executed to perform one or more of the acts or functions described herein or shown in the figures.

The memory 114 may store an application 130 implementing the disclosed techniques. In certain embodiments, the application 130 may be accessed from or stored in different locations. The processor 112 may access the application 130 stored in the memory 114 and execute computer-readable instructions included in the application 130.

In certain embodiments, during an installation process, the application may be transferred from the input device 118 and/or the network 140 to the memory 114. When the computing device 100 is running or preparing to run the application 130, the processor 112 may retrieve the instructions from the memory 114 via the communication network 110.

III. Subscription Control Module

Figure 2:
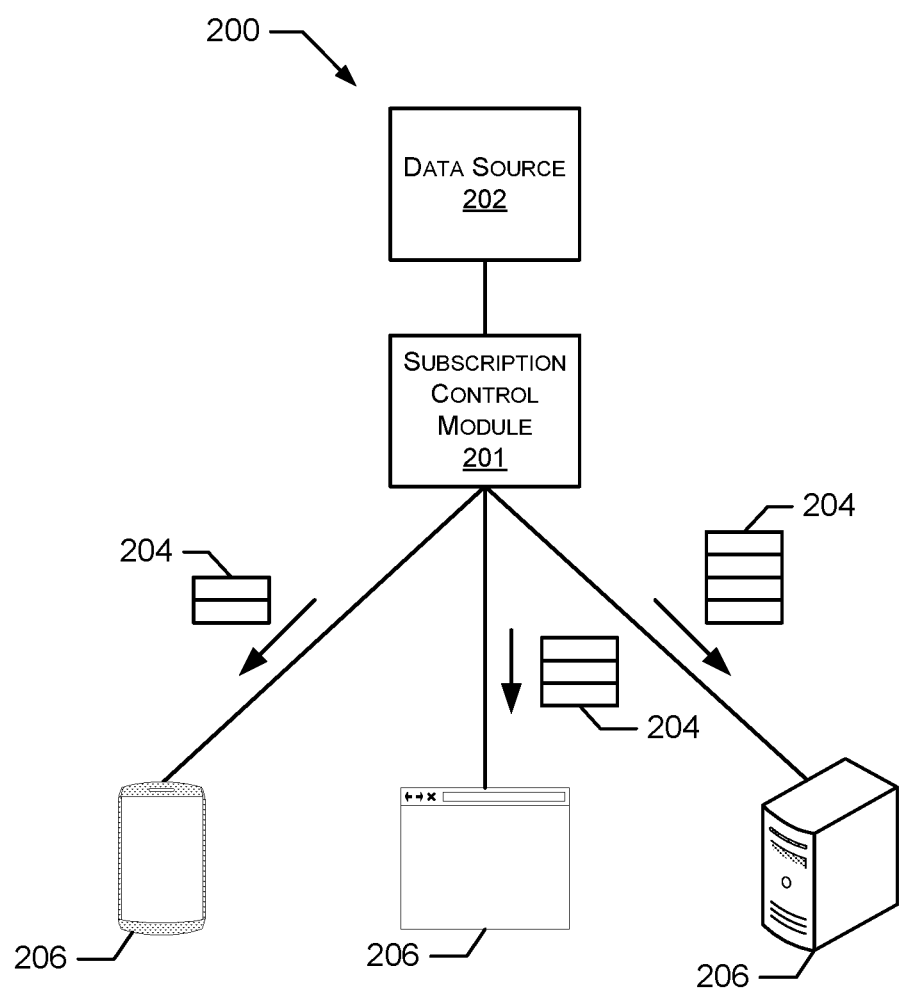
FIG. 2 illustrates a block diagram of an example system for sending tailored messages to one or more receiving devices.

FIG. 2 illustrates an example system 200 including a subscription control module 201 and a data source 202. In the illustrated example, the data source 202 provides data to the subscription control module 201. The subscription control module 201 may receive and/or otherwise retrieve the data, for example, when sent by the data source 202, periodically (e.g., at a set time interval), upon detecting an update, and/or in response to a triggering event, etc. The subscription control module 201 transforms the data into tailored messages 204. The tailored messages 204 are sent, via a communications link (e.g., a point-to-point connection, a unicast channel, a transmission control protocol (TCP) socket, a WebSocket connection, etc.), to one or more receiving devices 206 (e.g., a smartphone, a tablet, a server, a personal computer, etc.). One or more preferences are defined with respect to the receiving device(s) 206 (e.g., update rate, number of levels of data, etc.). In some examples, the electronic devices 206 communicate the preferences to the subscription control module 201. For example, for subscription control module 201 that generates updates every 100 ms, a recipient 206 may set a preference to only receive an update as often as every 500 ms. In some examples, the preferences for an electronic device 206 are determined by the subscription control module 201. For example, the subscription control module 201 may determine that, based on latency during the connection process with an electronic device 206 that an update rate should be set to is with only 3 levels of data. In some examples, the subscription control module 201 adjusts the update rate based on network link throughput. For example, if a previous update is still being sent, the subscription control module 201 may delay sending the next update. In such an example, if a more recent update is generated during the delay, the subscription control module 201 may send the more recent update instead. The subscription control module 201 communicates with the recipients 206 through a network (e.g., the Internet, a wide area network, etc.) via wired and/or wireless connections (e.g., a cable/DSL/satellite connection, a cellular connection, a Long Term Evolution (LTE) connection, etc.).

Figure 3:
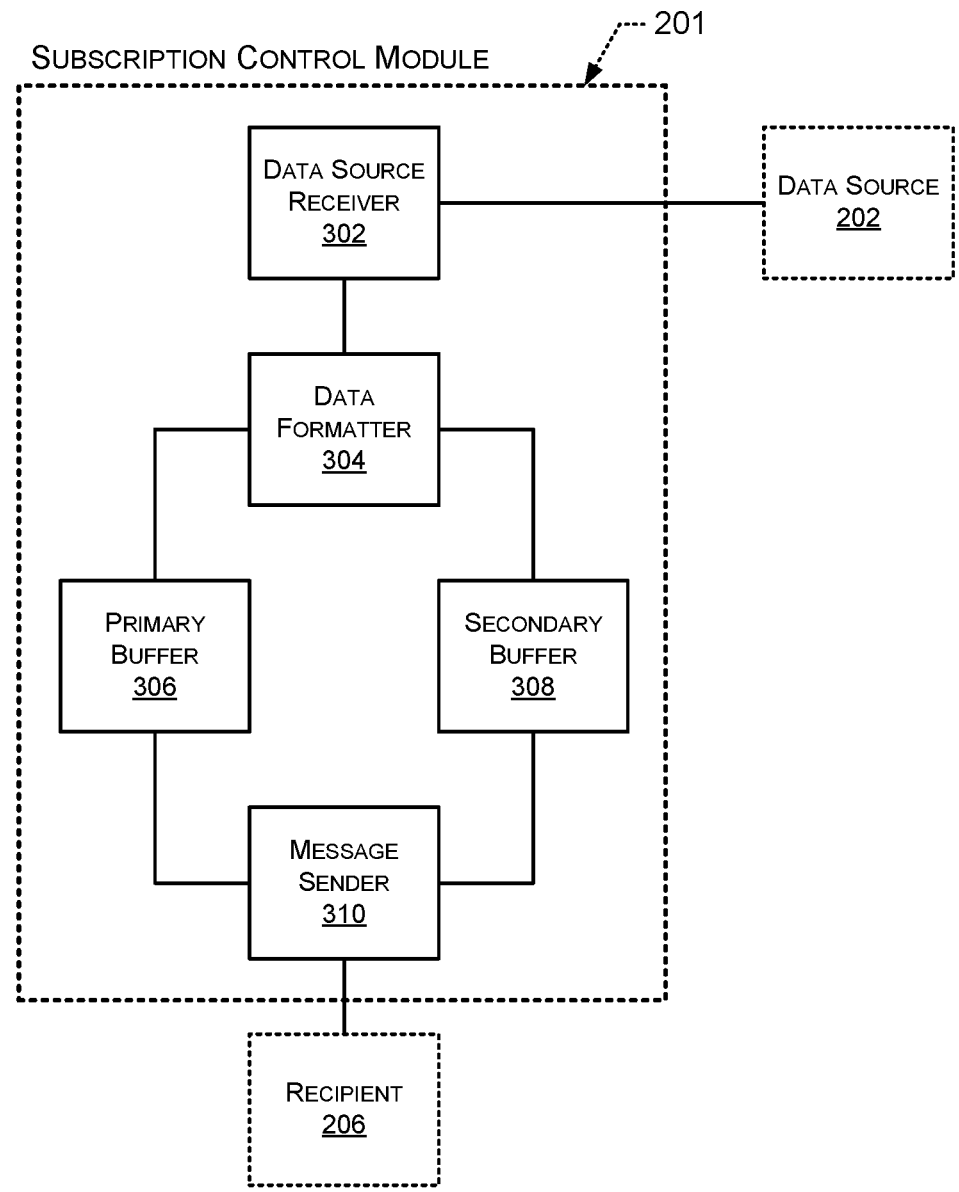
FIG. 3 illustrates a block diagram of an example subscription control module which may be used to send snapshots and deltasnaps to one or more receiving devices.

FIG. 3 illustrates an example implementation of the subscription control module 201 of FIG. 2. The subscription control module 201 receives and/or otherwise retrieves data from the data source 202, and sends tailored messages (e.g., tailored messages 204 of FIG. 2) to one or more electronic devices 206. The subscription control module 201 of the illustrated example includes a data source receiver 302, a data formatter 304, a primary buffer 306, a secondary buffer 308 and a message sender 310. The data source receiver 302 receives and/or otherwise retrieves data from the data source 202.

In the example illustrated in FIG. 3, the data source 202 updates dynamically (e.g., asynchronously updates as new information becomes available, updates periodically with periods of inactivity, etc.). To receive and process the data and send a message to the recipient(s) 204, data source receiver 302 captures a state of the data source 202 at discrete points in time (e.g., via the data source receiver 302 of FIG. 3). In some examples, the data source receiver 302 captures a state of the data source 202 when the data source 202 provides an update about a change in its state. In some examples, the data source receiver 302 captures the state of the data source 202 at set time intervals (e.g., examples in which the data source updates frequently). For example, the data source receiver 302 may capture the state of the data source 202 every 100 milliseconds. In some examples, the data source receiver 302 captures the state of the data source 202 in response to detecting an update (e.g., examples in which the data source updates sporadically). The data source receiver 302 may establish a base update rate. The base update rate is the rate at which the subscription control module 201 makes updates available to receiving devices 206. In some examples, the base update rate is established at regular intervals (e.g., when the data source 202 updates frequently, etc.). In some examples, the base update rate is established at irregular intervals (e.g., when the data source 202 update infrequently, etc.) In some examples, the base update rate changes depending on a frequency of changes of the data source 202.

In the illustrated example of FIG. 3, the data formatter 304 formats (e.g., marshals, translates, standardizes, organizes, etc.) data from the data source 202. The data formatter 304 transforms the data into a tailorable message to be stored in the primary buffer 306 and/or the secondary buffer 308. The primary buffer 306 and/or the secondary buffer 308 store data formatted by the data formatter 304. In some examples, the data stored in the primary buffer 306 and/or the secondary buffer 308 is accessed by the data formatter 304 to compare to subsequent data from the data source 202. For example, the primary buffer 306 may include a tailorable snapshot message. The data formatter 304 may then compare the data from the data receiver 302 with the tailorable snapshot message in the primary buffer 306 to generate a tailorable deltasnap message in the secondary buffer 308, utilizing techniques discussed in more detail below.

In the illustrated example, the message sender 310 manages connections with one or more recipient electronic devices 206. The message sender 310 uses a tailorable message stored in the primary buffer 306 and/or the secondary buffer 308 and sends the data as a tailored message 204 to the recipient electronic device(s) 206. In some examples, the message sender 310 receives preferences from the recipient electronic device(s) 206. For example, the preferences may include a preference for an update rate and/or a preference for a number of levels of data. In some such examples, the message sender 310 tailors the tailorable message stored in the primary buffer 306 and/or the secondary buffer 308 based on the received preferences to send to the recipient electronic device(s) 206. To tailor the tailorable message, the message sender 310 calculates what part of the tailorable message (e.g., in number of bytes) is to be sent based on the received preferences. For example, if the tailorable message is 100 bytes, the message sender 310 may, based on the received preferences, calculate that only the first 56 bytes are to be sent to the recipient electronic device(s) 206. In this manner, no per-recipient retransformation of a message is required. The data formatter 304 formats the tailorable message specifically to allow truncated sending. In some examples, when the message sender 310 detects that the connection to the recipient electronic device 206 is congested, the message sender 310 delays or drops the message to the device 206.

IV. Current Techniques for Communication of Data Source Updates

Current techniques for providing update about changes in the state of a data source include snapshots and deltas, of which some example techniques are described further below.

A. Snapshot Techniques

A snapshot represents a state of a data source at a particular point in time. A snapshot can be used to communicate an update to a receiving device. An example snapshot technique communicates the state of a data source by sending a snapshot message to one or more receiving devices for each update. Because snapshot techniques send the entire state of the data source at a particular point in time to the recipient(s), the state of the data source at a time t can be determined as illustrated in Equation (1):

$$\text{Current State}(t) = S_t \qquad \text{Equation (1)},$$

where, $S_t$ represents the snapshot sent most recently prior to time t.

Figure 4:
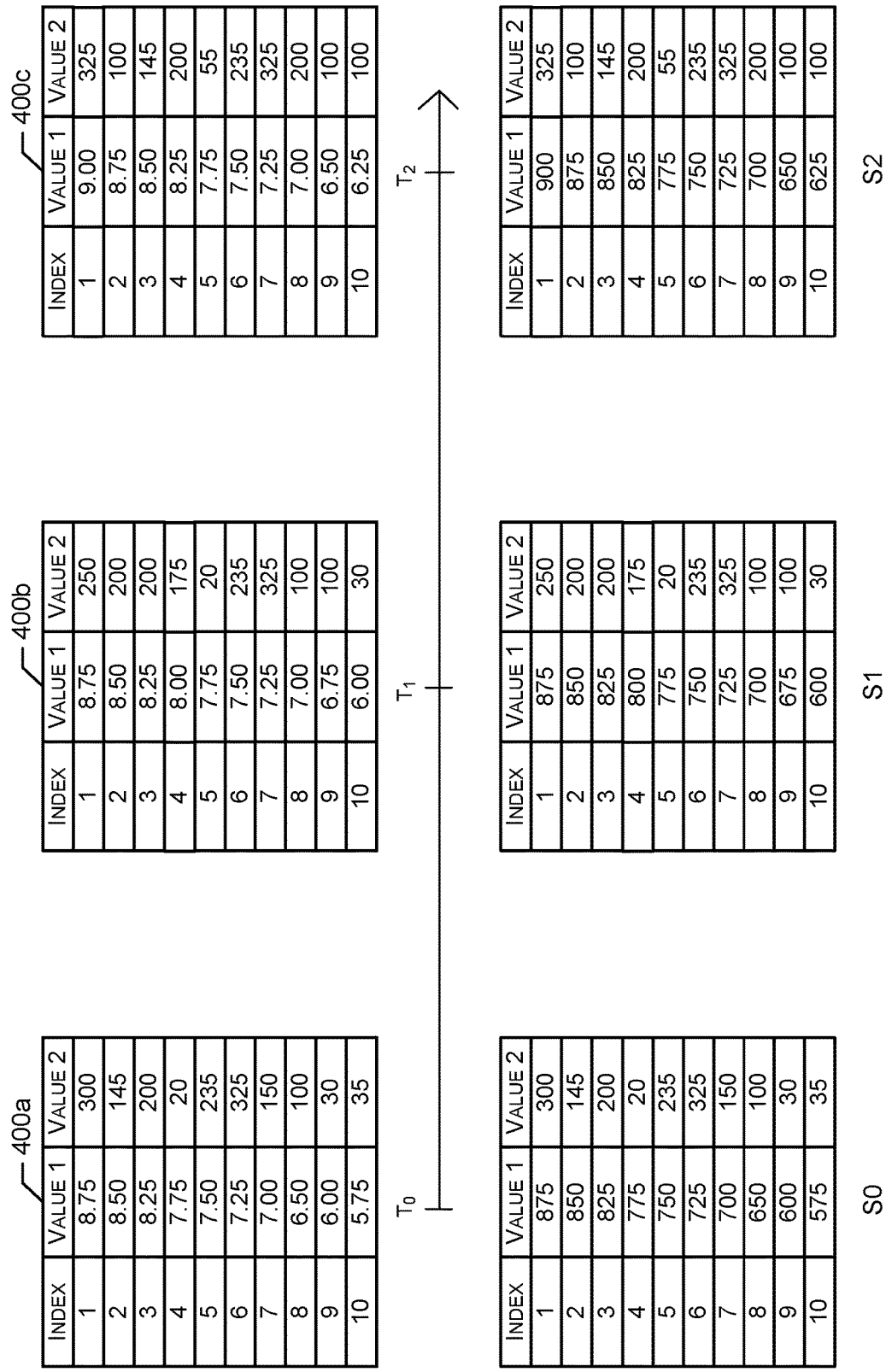
FIG. 4 illustrates a data flow showing an example using the snapshot technique.

FIG. 4 illustrates a data flow showing an example using the snapshot technique using an example first state 400a, an example second state 400b, and an example third state 400c of the data source at discrete times (e.g., time $T_0$, time $T_1$, time $T_2$, etc.). In the example illustrated in FIG. 4, the first state 400a is captured at time $T_0$. The first state 400a is formatted to be snapshot $S_0$, and stored in a buffer. The snapshot $S_0$ is sent to a recipient. At time $T_1$, second states 400b is captured, formatted to be snapshot $S_1$, and sent to the recipient. At time $T_2$, data 400c is captured, formatted to be snapshot $S_2$, and sent to the recipient.

Because a snapshot includes all of data required to know the current state of a data source, effects of a missed snapshot can be reduced or minimized (e.g., by waiting for the next update, etc.). However, because the data from the data source may only change slightly from interval to interval, sending snapshots may unnecessarily use valuable data bandwidth. As a result, a recipient receiving messages from a data source that updates frequently, many different data sources, and/or recipients with limited bandwidth (e.g., mobile devices using a cellular network connection, etc.) may experience congestion and/or lost messages.

B. Delta Techniques

A delta represents a difference between a most recent previous state of a data source and a current state of the data source. The most recent previous state is the last snapshot as adjusted by all intervening deltas. Delta techniques use periodic snapshots separated by one or more deltas to communicate updates to receiving devices. An example delta technique communicates the state of the data source by, periodically (e.g., at a set time interval) and/or aperiodically (e.g., after a certain number of updates), sending snapshots to recipient(s). In between the snapshots, deltas are periodically and/or aperiodically sent to the recipient(s). Accordingly, a current state of the data source at a time t can be determined as illustrated in Equation (2):

$$\text{Current State}(t) = S_R + \Delta_1 + \Delta_2 + \ldots \Delta_t \qquad \text{Equation (2)},$$

where $S_R$ represents the snapshot sent most recently prior to time t, and $\Delta_1$ through $\Delta_t$ represent deltas sent since that most recent snapshot.

Figure 5:
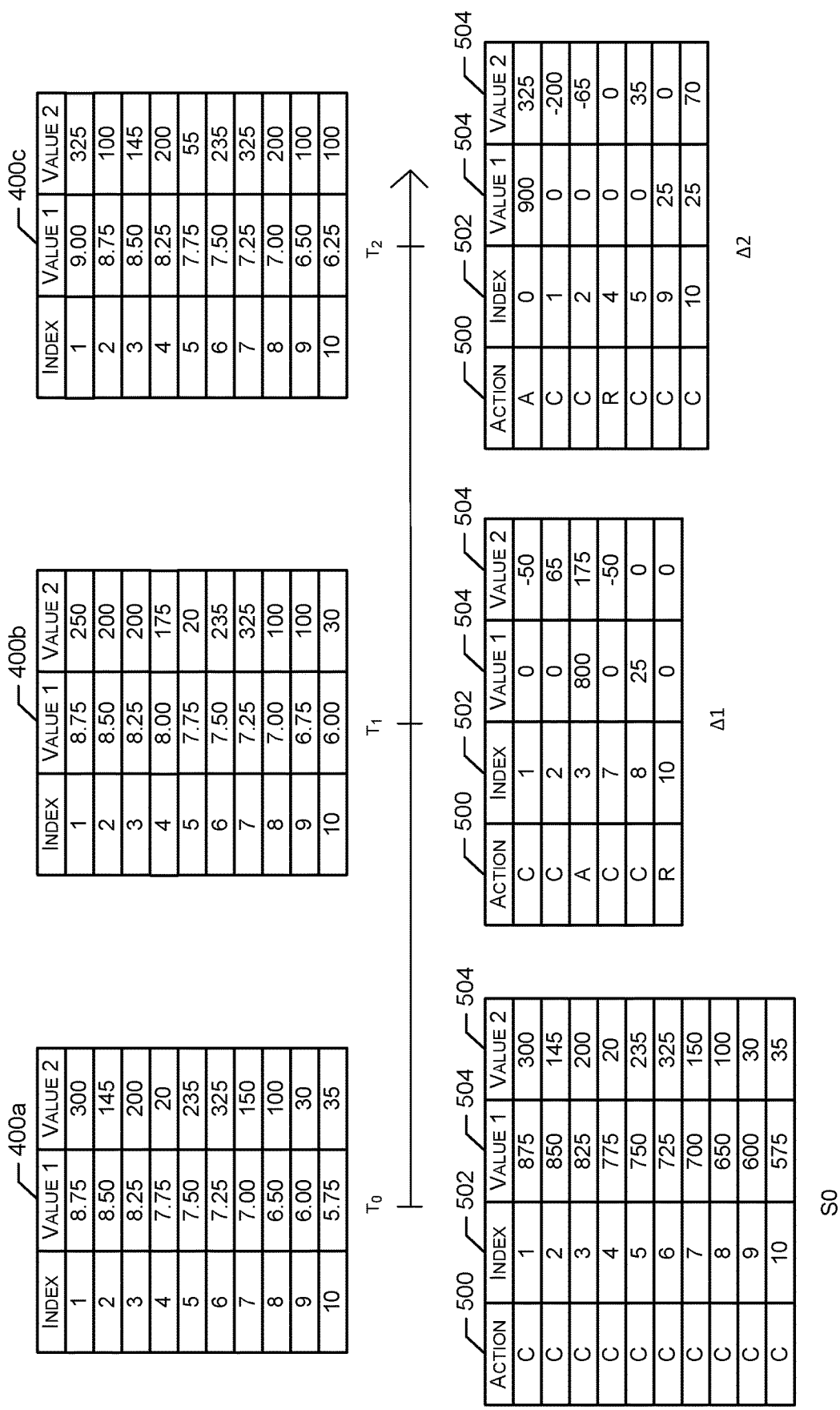
FIG. 5 illustrates a data flow showing an example using the delta technique.

FIG. 5 illustrates a data flow showing an example delta technique including an example first state 400a, example second state 400b, and example state 400c of a data source at time $T_0$, time $T_1$, and time $T_2$ respectively. In the example illustrated in FIG. 5, at time $T_0$, the first state 400a is captured, formatted to be snapshot $S_0$ and sent to a recipient. At time $T_1$, the second state 400b is captured and is compared to the second state 400b. An example delta $\Delta_1$ is generated based on the differences. The delta $\Delta_1$ is then sent to the recipient. At time $T_2$, third state 400c is captured and compared to the second state 400b to generate a delta $\Delta_2$ based on the differences. The delta $\Delta_2$ is then sent to the recipient. In the illustrated example of FIG. 4, the deltas (e.g., delta $\Delta_1$ and delta $\Delta_2$) include instructions 500 (e.g., add (A), change (C), remove (R)), an index 502 to indicate what part of the data to change, and values 504 (e.g., value 1 and value 2) to indicate how the data is to change. For example, a delta may instruct the the recipient to change (C) the values (Value 1, Value 2) at index 1 by (0,−50). In some examples, snapshots (e.g., snapshot S0) are flagged as snapshots and do not include instructions 500.

Delta techniques may reduce bandwidth usage because, between snapshots, only the changed portion of the update is communicated to the recipient(s). However, because deltas only communicate a part of any update, if a delta is not timely received (e.g., due to congestion, due to a connection interruption, due to a lost message, etc.), the recipient's data may become erroneous or the recipient may have to wait until a new snapshot is sent, having to disregard all subsequently received deltas until then.

V. Deltasnap Techniques and Message Rate Tailoring

Certain embodiments provide improved communication of a state of a data source (e.g., the data source 202) to one or more recipient devices (e.g., one or more electronic devices 206) using techniques referred to herein as deltasnap techniques. Deltasnap techniques provide for more efficient bandwidth utilization as compared to snapshot techniques and more resilience to data loss than delta techniques. In addition, deltasnap techniques provide for efficient message rate and number of levels tailoring while reducing redundant data that would be sent using only snapshot techniques and reducing the complexity and storage needed to use delta techniques.

A deltasnap represents a difference between the most recent snapshot sent to the recipient (e.g., recipient 206 of FIGS. 2 and 3) and the current state of the data source (e.g., data source 202 of FIGS. 2 and 3) to be provided in an update. An example deltasnap technique communicates the state of a data source by, periodically and/or aperiodically (e.g., at a set time interval, after a certain number of updates, upon a triggering condition, etc.), sending snapshots to recipient(s). Snapshots are sent to all recipients. Additionally, the most recent snapshot is sent in response to a new connection. Preferably, snapshots are sent using a communications technique that guarantees reliable delivery of the snapshot. Snapshots may be generated in a manner similar to those in the snapshot techniques discussed above, for example. Additionally, between the snapshots, generally one or more deltasnaps are generated. The deltasnaps may be generated at the base update rate (e.g., a rate at which the data source 202 provides updates to the subscription control module 201 of FIGS. 2 and 3 or a least common multiple of the update rate preferences of the recipients 206). In some examples, receiving devices 206 may subscribe to deltasnaps at an update rate less frequent than the base update rate. For example, if the base update rate of subscription control module 201 is 25 milliseconds, a recipient may prefer to receive a deltasnap no sooner than every 100 milliseconds (i.e., every fourth deltasnap if updates occur at or faster than the base update rate). Deltasnaps may be generated in a manner similar to deltas in the delta techniques discussed above, for example, except that the deltasnap is done with respect to the most recently sent snapshot and not with respect to the state represented by the most recently sent delta. When a deltasnap is being generated, it is possible that because of the scope of the changes from the previous snapshot to be represented, the representation of the deltasnap may be larger than an equivalent snapshot would be. In such situations, in some embodiments, generation of the deltasnap may be abandoned and a new snapshot may be generated and sent instead. Using the deltasnap technique, the state of the data source 202 at a time t can be determined as illustrated in Equation (3):

$$\text{Current State}(t) = S_R + \Delta S_t \qquad \text{Equation (3),}$$

where, $S_R$ represents the snapshot sent most recently prior to time t, and $\Delta S_t$ represents the deltasnap sent most recently prior to time t.

Figure 6:
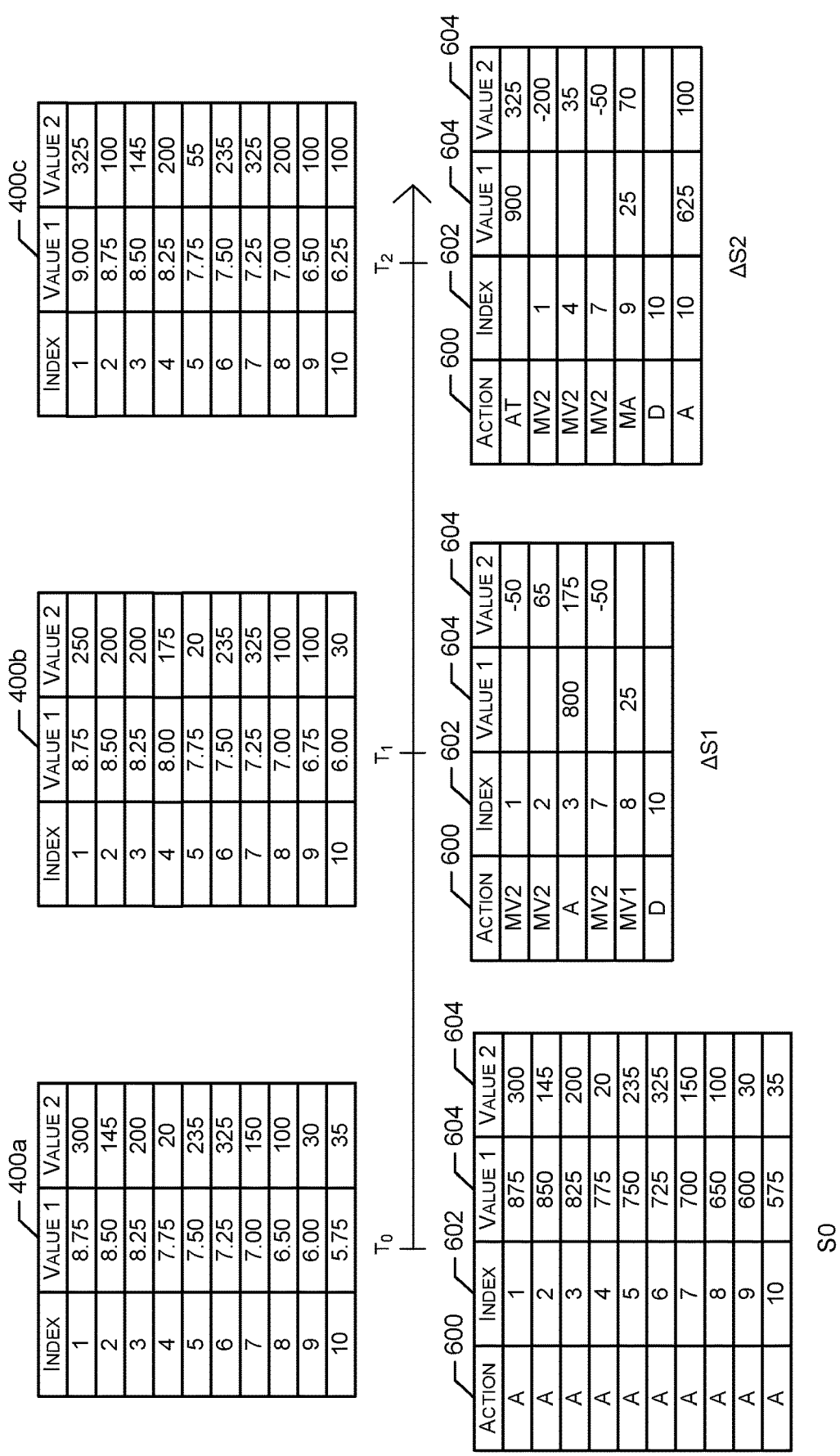
FIG. 6 illustrates a data flow showing an example using the deltasnap technique.

FIG. 6 illustrates a data flow showing an example deltasnap technique including an example first state 400a, example second state 400b, and example state 400c of the data source 202 at time $T_0$, time $T_1$, and time $T_2$ respectively. In the example illustrated in FIG. 6, the first state 400a is captured by the data source receiver 302 (FIG. 3), formatted to be snapshot $S_0$ by the data formatter 306 (FIG. 3) and placed in the primary buffer 306 (FIG. 3). The message sender 310 (FIG. 3) sends the snapshot $S_0$ to the recipient(s) 206 (FIG. 3). At time $T_1$, the second state 400b is captured by the data source receiver 302. In the illustrated example, the data formatter 304 compares the snapshot $S_0$ in the primary buffer 306 with the second state 400b. Based on the differences, the data formatter 304 generates an example deltasnap $\Delta S_1$. The delta snap $\Delta S_1$ is stored in the secondary buffer 310 (FIG. 3). The deltasnap $\Delta S_1$ is then sent to the recipient(s) 206 by the message sender 310 in accordance with each recipient's update rate preference.

As illustrated in the example of FIG. 6, at time $T_2$, the data source receiver 302 captures the third state 400c of the data source 202. The data formatter 304 compares the snapshot S0 stored in the primary buffer 306 with the third state 400c and generates a deltasnap $\Delta S_2$ based on the differences. The deltasnap $\Delta S_2$ is stored in the secondary buffer 308. The deltasnap $\Delta S_2$ is then sent to the recipient(s) 206 by the message sender 310 in accordance with each recipient's update rate preference. In the example illustrated in FIG. 6, the deltasnaps $\Delta S_1$, $\Delta S_2$ are generated with actions 600, an index 602 to indicate what part of the data to affect, and/or changes to values 604 (e.g., value 1 and value 2).

Because a deltasnap includes information about one or more updates to data at the data source 202 that have occurred since the last snapshot, the deltasnap technique allows updates to be sent to recipient(s) 206 with different update rate preferences in multiples of the base update rate. For example, if snapshots are created every two minutes and deltasnaps are created every second in between snapshots, a first recipient may set a preference to receive a deltasnap every five seconds, and a second recipient may set a preference to receive a deltasnap every ten seconds. Each snapshot is sent to every recipient. When a deltasnap is generated, it can then be sent to recipients in accordance with their preference. Thus, each recipient may not be sent every deltasnap. Since the deltasnap represents changes with respect to the most recently sent snapshot, it is not necessary for a particular recipient to receive each deltasnap in order to determine the latest update for the data source.

Because deltasnaps contain a portion of information regarding an update of the data source 202, the deltasnap technique generally requires less bandwidth compared to snapshot techniques.

In some examples, the deltasnap technique may require more bandwidth than delta techniques. For example, if the data source 202 changes, and then doesn't change again for a while, a deltasnap would repeatedly include the change, while a delta would not. However, subscribing to a data source and recovering from lost message is more manageable using the deltasnap technique compared to the delta techniques. For example, using the deltasnap technique, a receiving device 206 may connect to the subscription control module 201 between snapshots and become up-to-date by receiving the most recent snapshot and the most recent deltasnap.

VI. Partitionable Data Level Techniques and Data Level Tailoring

Figure 7A:
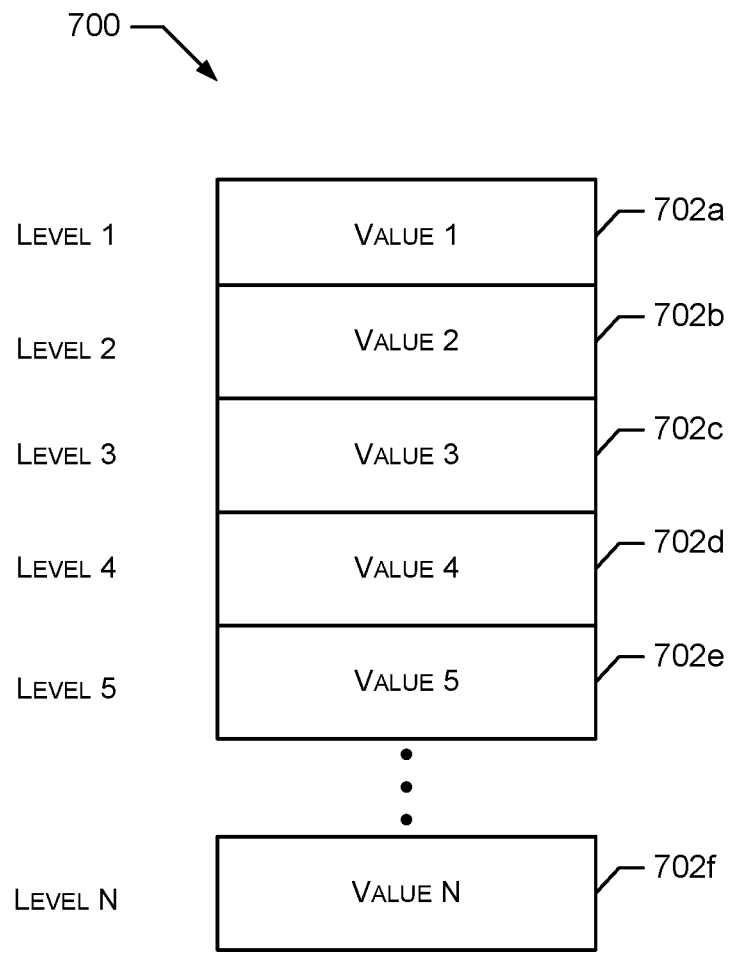
FIGS. 7A and 7B illustrate block diagrams showing example data levels.

Certain embodiments provide improved communication of a state of the data source 202 to one or more recipient devices 206 using techniques referred to herein as partitionable data levels techniques. Partitionable data levels refer to an organization of data in an update into levels or tiers. In the illustrated examples of FIGS. 7A and 7B, data 700 received from a data source (e.g., data source 202 of FIGS. 2 and 3) is organized into data levels 702a-702f by a data formatter (e.g., the data formatter 304 of FIG. 3). In some examples, the data levels 702a-702f are organized in descending levels of interest (e.g., the first level 702a includes the most requested data, the second level 702b includes the second most requested data, etc.) Additionally or alternatively, each data level 702a-702f represents a level of information detail. The data levels 702a-702f are partitionable from the data levels 702 below (e.g., a first data level 702a may be used to create a tailored message 204 of FIG. 2, the first data level 702a and the second data level 602b may be used to create a tailored message 204, etc.). That is, data is ordered into levels or tiers such that recipients may specify a preference to receive only a subset of the levels, beginning with a first data level 702a and through a preferred data level. For example, some recipients may prefer to receive the first three data levels (levels 702a-702c) while other recipients may prefer to receive only the first data level (level 702a). Some recipients may desire only information in the fifth data level (level 702e), but, in accordance with the partitionable data levels technique, such recipients are willing to also receive levels above their desired data level (in this case, levels 702a-702d).

Figure 7B:
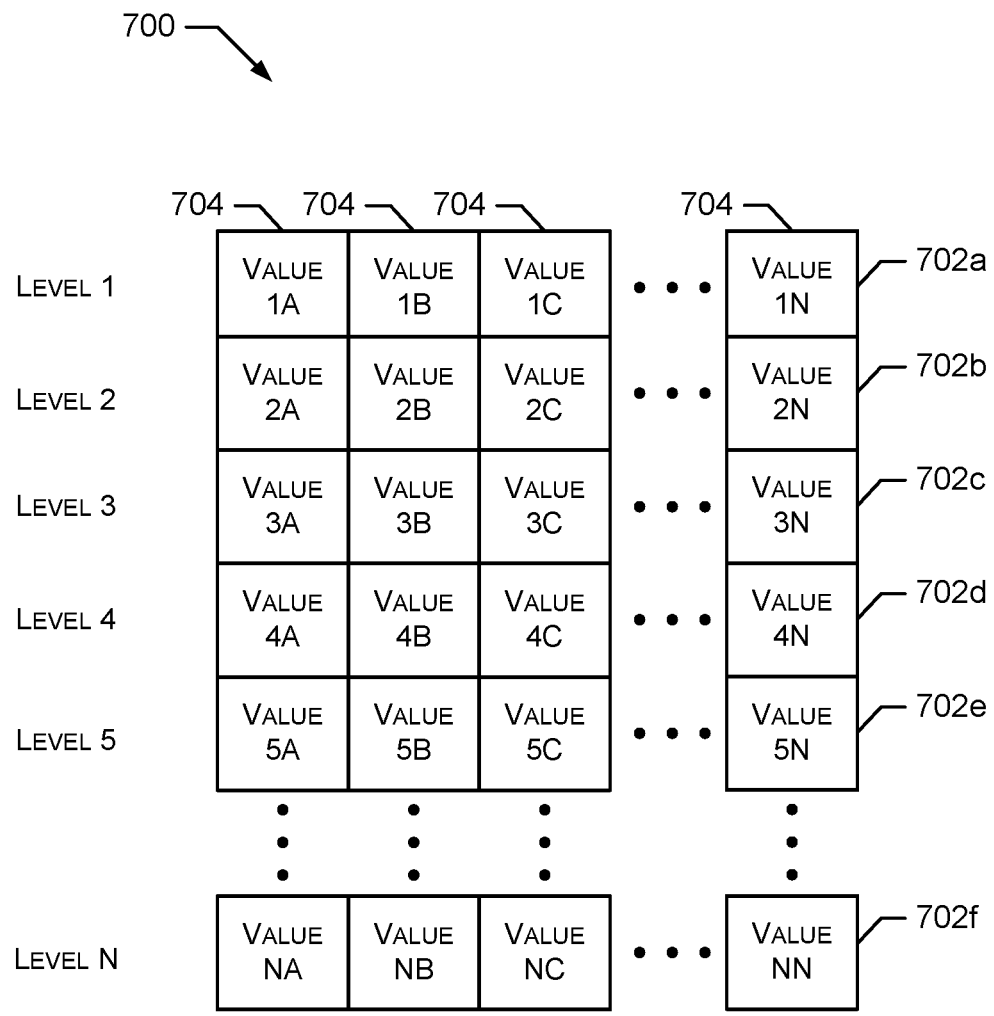

In the illustrated example of FIG. 7B, a data level 702 may include multiple data values 704. In the illustrated example, the data values 704 in the data levels 702 are not partitionable. For example, if a receiving device 206 requests a particular value 704 included in the first data level 7602a, the receiving device 206 accepts the entire first data level 702a. For example, the data source 202 may provide Twitter hashtags and their publish rates. The data formatter may organize the Twitter hashtags in descending order of their publish rates. The top hashtag may be a first data level (e.g., data level 702a), hashtags two through ten may be a second data level (e.g., data level 702b), and hashtags eleven through one hundred may be a third data level (e.g., data level 702c). If a recipient prefers to receive only the top hashtag, they would receive the first data level. If a recipient prefers to receive the top ten hashtags, they would receive the first data level and the second data level.

Partitionable data levels facilitate generation of tailorable messages that allow customization of messages to multiple receiving devices (e.g., recipients 206 of FIG. 3) without remarshaling data into a message buffer for each recipient. For example, if a thousand receiving devices (e.g., the receiving devices 206 of FIGS. 2 and 3) are connected to a subscription control module (e.g., the subscription control module 201 of FIGS. 2 and 3), each receiving device 206 may be sent update messages with different levels of interest and/or levels of detail (e.g., using the partitionable data levels of FIGS. 7A and 7B) without the sender having to marshal the data for each update message for each recipient.

Figure 8A:
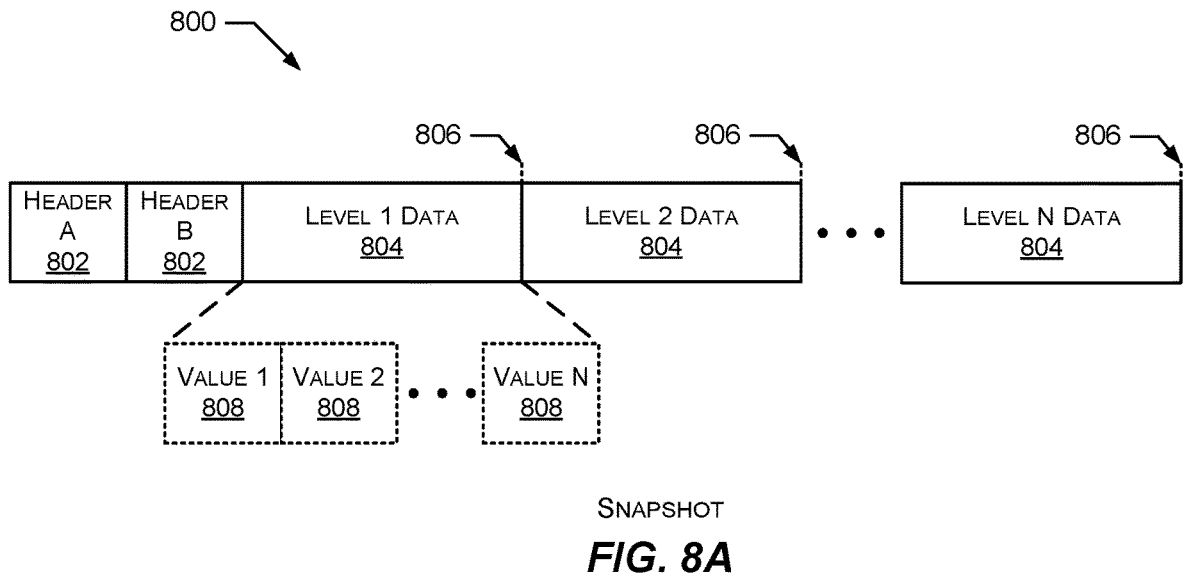
FIGS. 8A and 8B illustrate block diagrams showing example tailorable messages based on snapshots and deltasnaps.
Figure 8B:
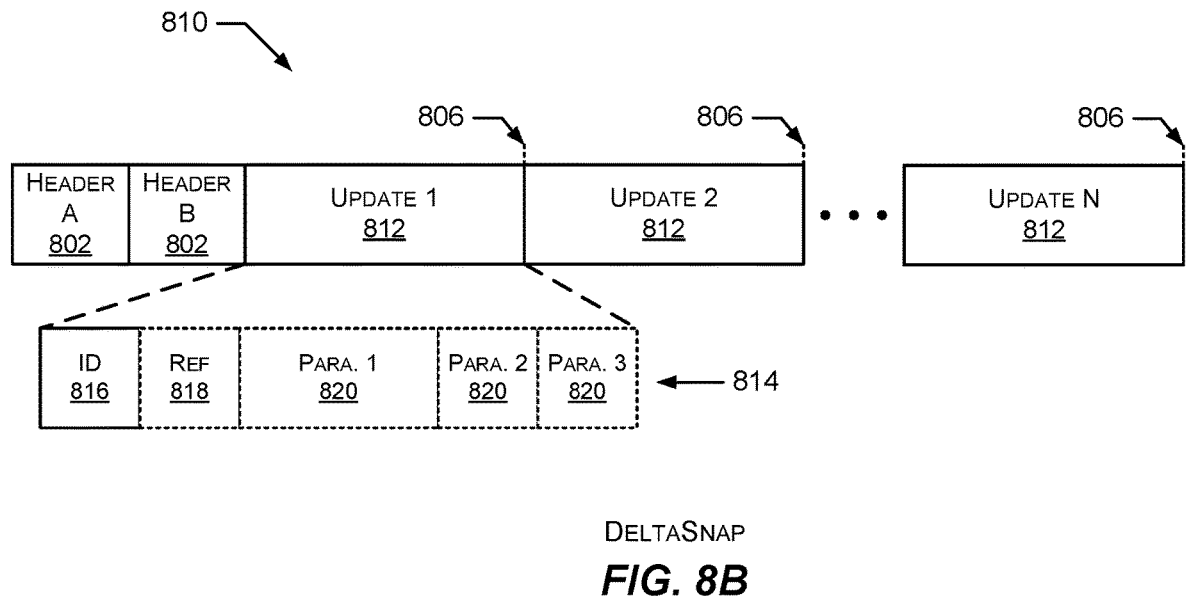

FIGS. 8A and 8B illustrate example tailorable messages that may be generated by a message formatter (e.g., the message formatter 304 of FIG. 3) and placed into a buffer (e.g. the primary buffer 306 and/or the secondary buffer 308 of FIG. 3). After being placed in the buffer, a message sender (e.g., the message sender 310 of FIG. 3) uses a portion of the tailorable message in the buffer to send to a receiving device (e.g., the receiving device 206 of FIGS. 2 and 3) as a tailored message 204. FIG. 8A illustrates an example tailorable message 800 based on a snapshot (e.g. snapshot S0 of FIGS. 4, 5, and 6). In the illustrated example of FIG. 8A, the tailorable message 800 includes one or more headers 802, and one or more data levels 804. The headers 802 include bookkeeping information (e.g., number of data levels 804, levels of precision, timestamp, etc.) and transmission information required to process the tailorable message 800 by a message sender (e.g. message sender 310 of FIG. 3).

The data levels 804 are partitionable data levels (e.g., the data levels 702 of FIGS. 7A and 7B) partitionable at one or more partition points 806. In some examples, each data level 804 may include multiple values 808. In some examples, to send a tailored message 204, the message sender 310 uses a portion of the tailorable message 800 up to one of the partition points 806 from the buffer. In the illustrated example of FIG. 8A, each data level 804 may include multiple values 808 to represent a state (e.g., first state 400a of FIGS. 4, 5, and 6) of the data source 202 corresponding to a level of detail and/or level of interest. For example, if a tailorable message 800 includes eight data levels 804, a receiving device 206, through setting a preference, may select only to receive the first two data levels 804. In such an example, the message sender 310 uses the header(s) 802 and the first two data levels 804 to send to the receiving device 206. In some embodiments, a socket write call may be used referencing the buffer and the appropriate length to include the preferred number of data levels for each recipient and no more.

FIG. 8B illustrates an example tailorable message 810 based on a deltasnap (e.g. deltasnap $\Delta S_1$ of FIG. 6). In the illustrated example of FIG. 8B, the tailorable message 810 includes one or more headers 802, and one or more updates 812. In the illustrated example, the updates 812 include an action 814. In some examples, each update 812 may include one or more actions 814. In the illustrated example, the actions 814 include information regarding that changes to the data source 202 since the last snapshot. The data updates 812 may be partitionable data levels (e.g., the data levels 702 of FIGS. 7A and 7B) partitionable at partition points 806. In some examples, to send a tailored message 204, the message sender 310 uses a portion of the tailorable message 810 up to one of the partition points 806 from the buffer (e.g., the primary buffer 306, the secondary buffer 308, etc.). In some examples, the tailorable message 810 may not include an update 812 corresponding to every date level 804 (e.g., no data in that particular data level 804 changed since the last snapshot, etc.).

In the illustrated example of FIG. 8B, the actions 814 include an action reference 816, an index 818, and one or more parameters 820. The action reference 816 identifies which action (e.g., action 600 of FIG. 6) to execute to update the data level 804 identified by the example index 814. The examples parameter(s) 820 identify a magnitude of the change to a value (e.g., a value 808) of the identified data level 804. Example action references 814 are described on Table (1).

TABLE 1

| Action Reference | Abbreviation | Description | Example Parameters |
|---|---|---|---|
| Add | A | Add a new data level before an index. | Value 1, Value 2, . . . Value N |
| Add Relative | AR | Add a new data level after an index based on the data level at the index and modified by the parameter(s). | Value 1, Value 2, . . . Value N |
| Add Top | AT | Add a new data level before the first data level (no index). | Value 1, Value 2, . . . Value N |
| Modify Nth Value | MVN | Modify a value of the data level identified by an index. | Value N |
| Modify All | MA | Modify all values of the data level identified by an index. | Value 1, Value 2, . . . Value N |
| Delete | D | Delete data level identified by an index. | |
| No Change | NC | Indicate that data level identified by an index has not changed | |

The example "Add" action adds a new data level (e.g., the data level 702a-702f of FIG. 7) after the data level specified by the index 814 with values (e.g., the values 704 of FIG. 7) specified by the example parameters 820. The example "Add Relative" action adds a new data level after the data level specified by the index 814 with the values of the data level specified by the index 814 modified (e.g., added, subtracted, etc.) by the values specified by the example parameters 820. The example "Add Top" action adds a new data level before the first data level with values specified by the example parameters 820. The example "Modify Nth Value" actions (e.g., "Modify 1st Value" (MV1), etc.) modifies the Nth value of the data level identified by the index 814 as specified by the example parameter 820. The example "Modify All" action modifies the values of the data level identified by the index 814 as specified by the example parameter 820. The example "Delete" action deletes the data level identified by the index 814. The example "No Change" action creates a duplicate of the data level specified by the index 814 before the data level specified by the index 814.

The tailorable message 810 may include an update 812 that adds a new data level 804 (e.g., using the "Add" action, the "Add Relative" action, and/or the "Add Top" action, etc.). Additionally or alternatively, the tailorable message 810 may include an update 812 that deletes an existing data level 804 (e.g., using the "Delete" action, etc.). When a data level 804 is deleted, lower data levels shift upwards. For example, a tailorable message 800 may include data level 1, data level 2, and data level 3. If, at the next update of the data source 202, the data level 2 is deleted, data level 3 shifts to become data level 2. However, in such an example, if a receiving device 206 only receives two data levels in a tailored message 204 (e.g., per the recipient's preferences), the receiving device 206 will not have information regarding data level 3. That is, when the receiving device 206 received the last snapshot, the tailored message 204 did not include information regarding data level 3. To facilitate the receiving device 206 having accurate, up-to-date information about the current state of the data source 202, the data formatter 304, when a deleted data level 804 is detected, may include an action 814 (e.g. a "No Change" action) that provides the up-shifted data levels 804 (e.g., data levels 1 and 3). In some examples, receiving device(s) 206 that already have the data level 804 ignore the "No Change" action 814.

Figure 9:
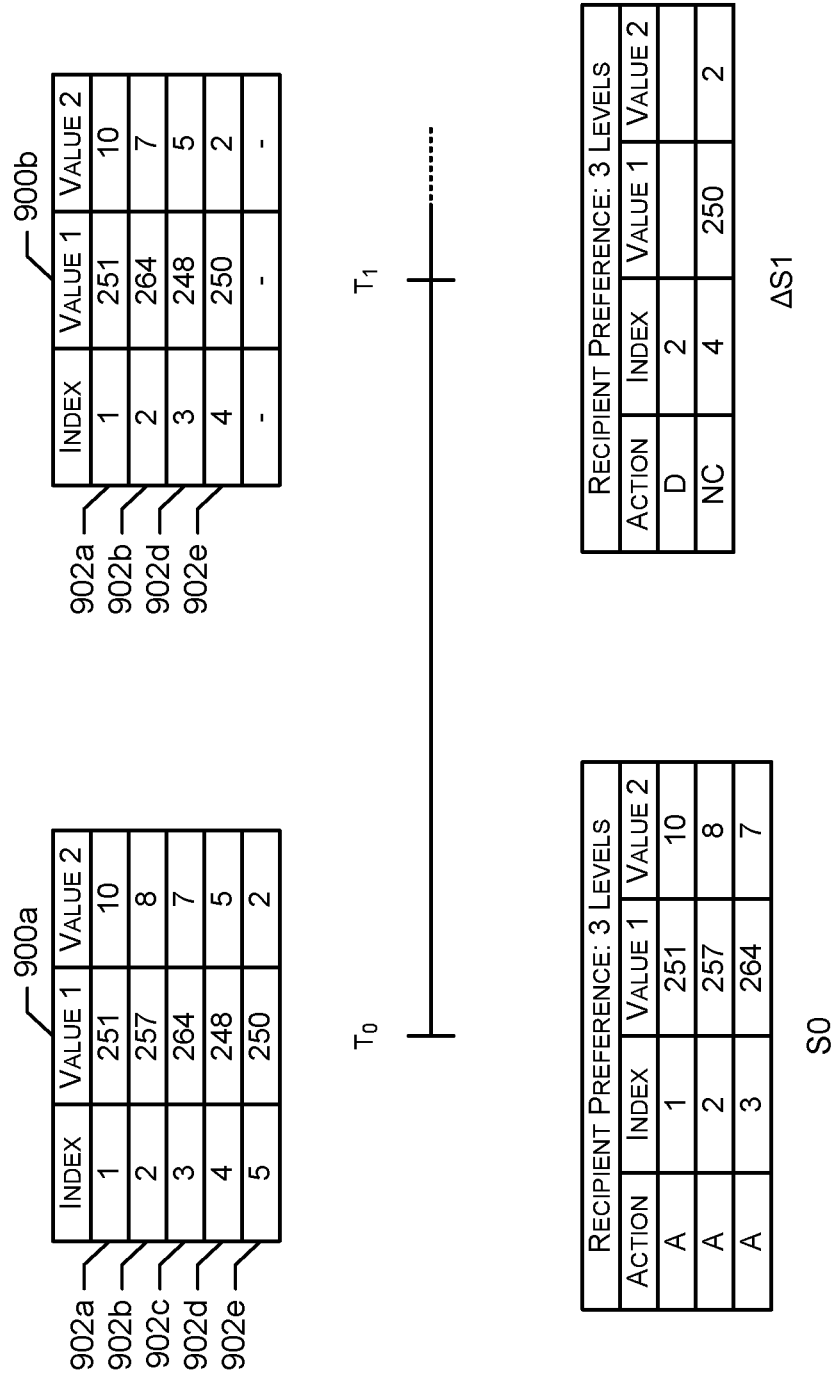
FIG. 9 illustrates a data flow showing an example using the tailored deltasnap technique.

FIG. 9 illustrates an example data flow in which a data level (e.g., the data level 804 of FIG. 8A) has been deleted. The illustrated example shows a first state 900a of the data source 202 (FIGS. 2 and 3) at a time $T_0$, and a second state 900b at a time $T_1$. The first state 900a and the second state 900b have been organized into a first data level 902a, a second data level 902b, a third data level 902c, a fourth data level 902d, and a fifth data level 902e. The data formatter (FIG. 3) generates a snapshot-based tailorable message (e.g., the tailorable message 800 of FIG. 8A) At time $T_0$, because the receiving device 206 (FIGS. 2 and 3) has set a preference for three data levels 804, a tailored snapshot $S_0$ with three data levels is sent to the receiving device 206. At $T_1$, the second data level 902b is deleted. In the illustrated example, the third data level 902c, fourth data level 902d and the fifth data level 902e shift up. When generating a deltasnap-based tailorable message (e.g., the tailorable message 810 of FIG. 8B), the data formatter 304 includes a "No Change" action. A tailored deltasnap $\Delta S_1$ is sent to the recipient with the "No Change" action.

Figure 10:
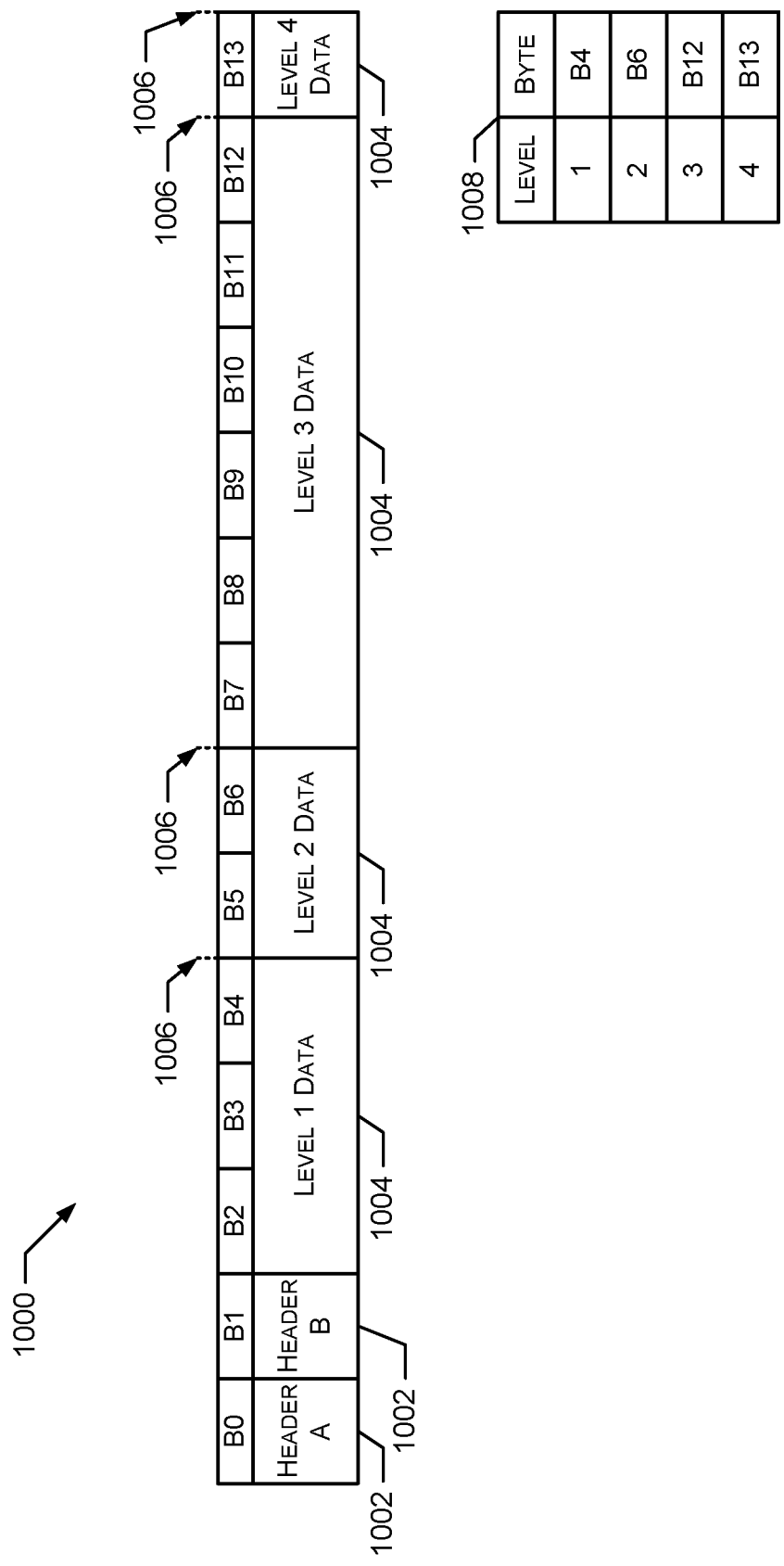
FIG. 10 illustrates an example tailorable message in a buffer.

FIG. 10 illustrates an example tailorable message 1000 (e.g., the snapshot-based tailorable message 800 of FIG. 8A and/or the deltasnap-based tailorable message 810 of FIG. 8B) in a buffer (e.g., the primary buffer 306 of FIG. 3 or the secondary buffer 308 of FIG. 3). The tailorable message 1000 includes one or more headers 1002 and one or more partitionable data levels 1004 (e.g., the data levels 804 of FIG. 8A or the updates 812 of FIG. 8B). In the illustrated example, while formatting the tailorable message, the data formatter 304 (FIG. 3) calculates the location in the buffer of partition points 1006. In some examples, the data formatter 304 generates a partition table 1008 that stores locations (e.g., byte offsets, etc.) in the buffer of partition points 1006. In some such examples, the partition table 1008 may be stored at the beginning or the end of the tailorable message 1000. In some examples, the partition table 1008 is used by the message sender 310 (FIG. 3) when sending tailored messages 204 (FIG. 2). In this manner, when sending a tailored message 204, the message sender 310 can quickly determine the required size (e.g., the byte amount in the buffer) of the tailorable message 1000 to use according to the preferences of the receiving device 206.

VII. Tailored Messaging Using Deltasnaps and Partitionable Data Levels

Certain embodiments provide improved communication of a state of the data source 202 to one or more recipient devices 206 using a combination of the deltasnap and partitionable data levels techniques.

Figure 11:
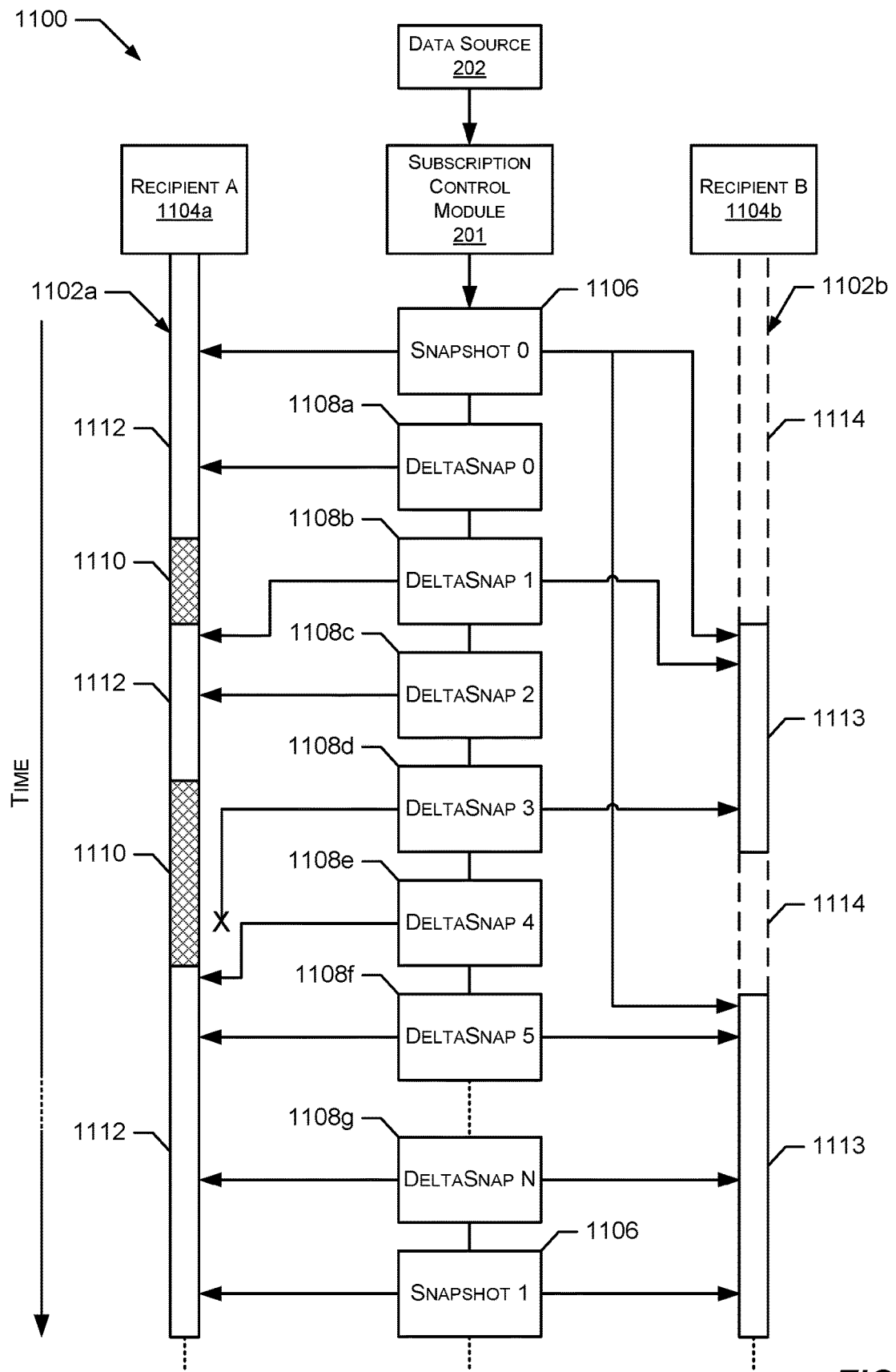
FIG. 11 illustrates an example data flow diagram depicting example connections between example receiving devices and the example subscription control module.

FIG. 11 illustrates an example data flow diagram 1100 depicting an example first connection 1102a between example receiving device A 1104a and the example subscription control module 201 of FIGS. 2 and 3. The diagram 1100 also depicts an example second connection 1102b between example receiving device B 1104b and the subscription control module 201. The subscription control module 201 generates snapshots 1106 at a snapshot threshold rate (e.g., every minute, every two minutes, etc.) and generates deltasnaps 1108a-1108g at a base update rate (e.g., every second, etc.) In the illustrated example, the subscription control module 201 sends the snapshots 1106 and the deltasnaps 1108a-1108g to the first connection 1102a and the second connection 1102b.

In the example illustrated in FIG. 11, the first connection 1102a, over time, has periods of congestion 1110 and periods of no appreciable congestion 1112. In the illustrated example, the receiving device A 1104a sets preferences regarding an update rate (e.g., a rate at which the deltasnaps 1108a-1108g are sent to the first connection 1102a) and/or a number of data levels to receive (e.g., how many data levels are includes in each snapshot 1106 and each deltasnap 1108a-1108g). In the illustrated example, the update rate set by the receiving device A 1104a is equal to the base update rate (e.g., the rate the deltasnaps 1108a-1108g are generated by the subscription control module 201). For example, if the base update rate is one second, the receiving device A 1104a receives deltasnaps 1108a-1108g at one second intervals. In some examples, the subscription control module 201 may detect the periods of congestion 1110. For example, a send socket of the subscription control module 201 may indicate that a send buffer is full and/or that the first connection 1102a is congested. In some examples, the subscription control module 201 delays the transmission of a delayed deltasnap 1108b until the first connection 1102a is no longer congested. When the period of congestion 1110 is longer than receiving device's 206 preferred update rate, the subscription control module 201 may drop the pending deltasnap 1108d and instead send the next deltasnap 1108e.

In the example illustrated in FIG. 11, the second connection 1102b, over time, has periods of connection 1113 and periods of disconnection 1114. In the illustrated example, the update rate set by the receiving device B 1104*b* is set to be less frequent than the base update rate. For example, if the base update rate is 100 milliseconds, the update rate of the receiving device B 1104*b* may be 200 milliseconds. In the illustrated example, when the connection 1102*b* is established between the subscription control module 201 and the receiving B 1104*b*, the subscription control module 201 sends the most recent snapshot 1106 and the most recent deltasnap 1108*b*, 1108*f*. Additionally or alternatively, if the period of disconnection 114 is short (e.g., less than the current update rate), the subscription control module 201 may send just the deltasnap 1108*f*.

Figure 12:
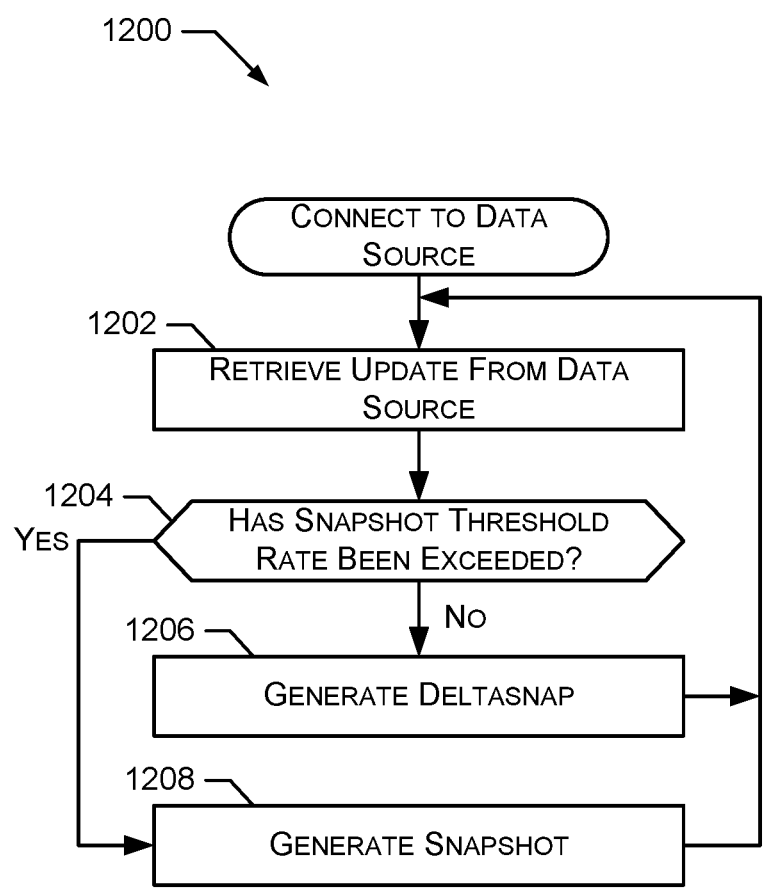
FIG. 12 is a flow diagram of an example method representative of example machine readable instructions which may be executed to implement the subscription control module of FIGS. 2 and 3.

FIG. 12 is a flow diagram of an example method 1200 representative of example machine readable instructions which may be executed to implement the subscription control module 201 of FIGS. 2 and 3 to generate snapshots and deltasnaps when the subscription control module established a connection with a data source (e.g., the data source 202 of FIGS. 2 and 3). Initially, at block 1202, the subscription control module 201 receives data sent from the data source 202. In some examples, the subscription control module 201 retrieves data at set intervals of time. Additionally or alternatively, the subscription control module 201 may retrieve data in response to detecting an update to the data source 202 and/or in response to a trigger. At block 1204, the subscription control module 201 determines whether a snapshot threshold rate has been exceeded. The snapshot threshold rate is a minimum amount of time between generating snapshots, for example. In some examples, the snapshot threshold may be based on how much the data source 201 changes each update (e.g., greater data source changes involve a shorter snapshot threshold).

If the snapshot threshold has been exceeded, then program control advances to block 1206. Otherwise, if the snapshot threshold has not been exceeded, then program control advances to block 1208. At block 1206, the subscription control module 201 generates a snapshot (e.g., a snapshot 1106 of FIG. 11). Program control then returns to block 1202. At block 1208, the subscription control module generates a deltasnap (e.g., the deltasnaps 1108*a*-1108*g* of FIG. 11). Program control then returns to block 1202. The example machine readable instructions 1200 are executed until the subscription control module 201 disconnects from the data source 202.

Figure 13:
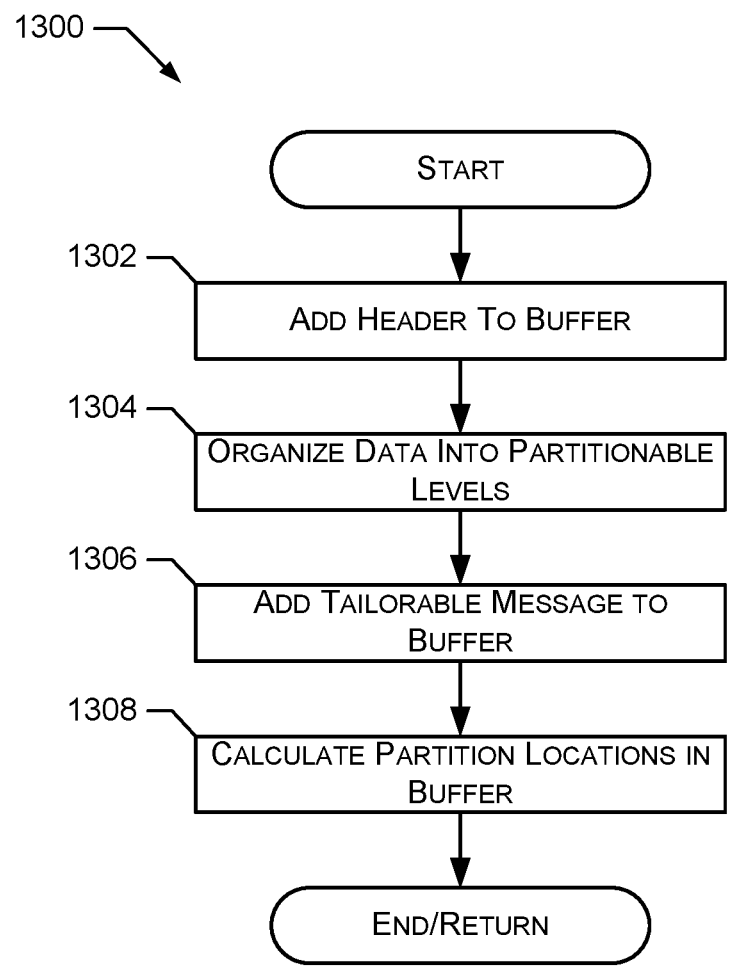
FIG. 13 is a flow diagram of an example method representative of example machine readable instructions which may be executed to implement the data formatter of FIG. 3.

FIG. 13 is a flow diagram of an example method 1300 representative of example machine readable instructions which may be executed to implement the data formatter 304 of FIG. 3 to generate a snapshot (e.g., the snapshot 1106 of FIG. 11) from data retrieved by the data source retriever 302 of FIG. 3. Initially, at block 1302, after receiving data from the data source retriever 302, the data formatter 304 adds one or more headers (e.g., the headers 802 of FIG. 8A, the headers 1002 of FIG. 10) to the primary buffer 306 of FIG. 3. At block 1304, the data formatter 304 organizes the data into partitionable data levels (e.g., the partitionable data levels 702*a*-702*f* of FIGS. 7A and 7B). In some examples, the data is organized into levels of interest and/or levels of detail. At block 1306, the data formatter 304 formats the organized data into a tailorable message (e.g., the tailorable message 800 of FIG. 8A, the tailorable message 1000 of FIG. 10, etc.). The tailorable message is then placed into the primary buffer 306. At block 1308, the data formatter 304 calculates the location in the primary buffer 306 of the partitionable points (e.g., the partitionable points 806 of FIG. 8A, the partitionable points 1000 of FIG. 10) of the tailorable message. In some examples, the data formatter 304 create a partition table (e.g., the partition table 1008 of FIG. 10) and appends it to the beginning or the end of the tailorable message in the primary buffer 306. Example program 1300 then ends.

Figure 14:
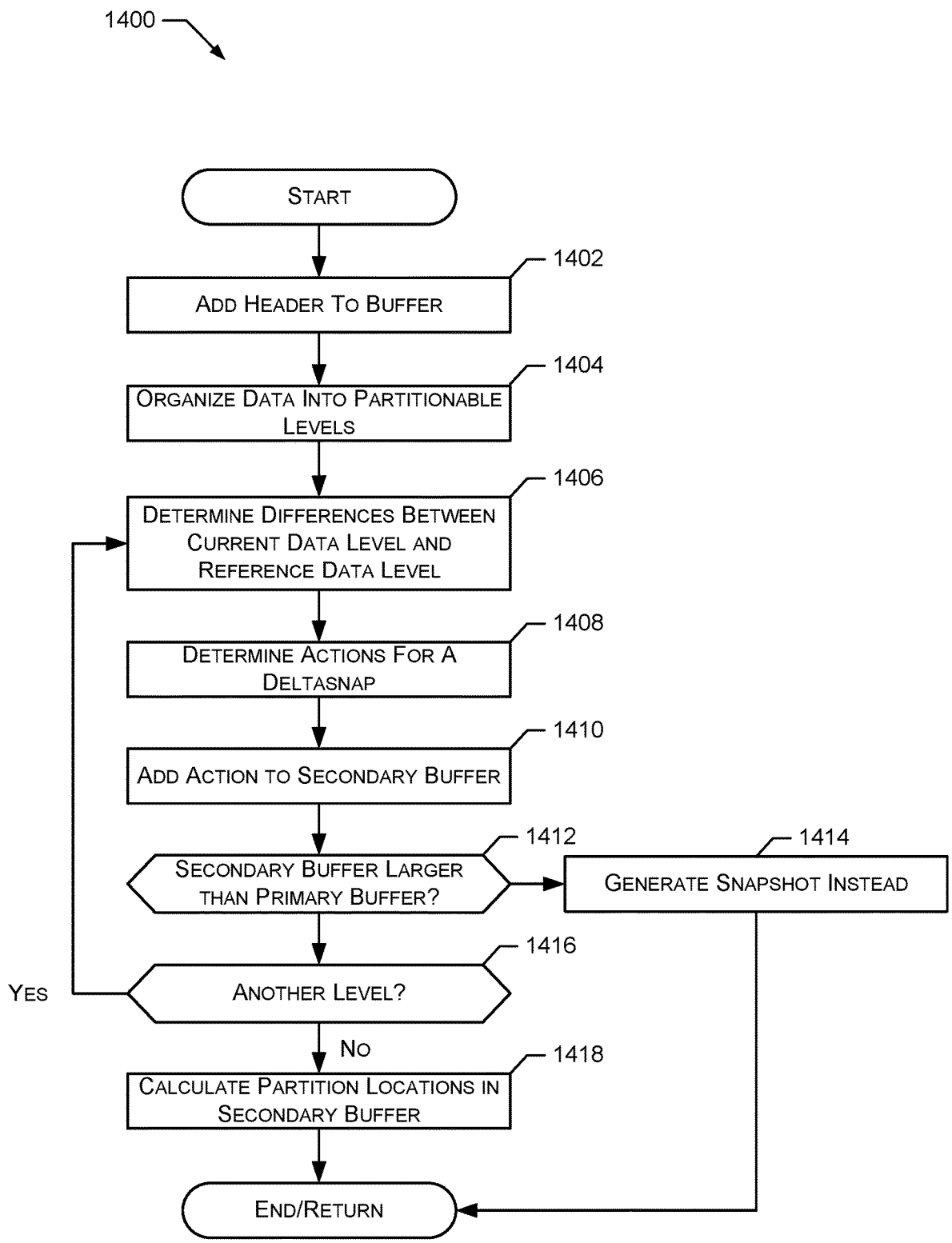
FIG. 14 is a flow diagram of an example method representative of example machine readable instructions which may be executed to implement the data formatter of FIG. 3.

FIG. 14 is a flow diagram of an example method 1400 representative of example machine readable instructions which may be executed to implement the data formatter 304 of FIG. 3 to generate a deltasnap (e.g., the deltasnaps 1108*a*-1108*g* of FIG. 11) from data retrieved by the data source retriever 302 of FIG. 3. Initially, at block 1302, after receiving data from the data source retriever 302, the data formatter 304 adds one or more headers (e.g., the headers 802 of FIG. 8B, the headers 1002 of FIG. 10) to the secondary buffer 308 of FIG. 3. At block 1404, the data formatter 304 organizes the data into partitionable data levels (e.g., the partitionable data levels 702*a*-702*f* of FIGS. 7A and 7B).

At block 1406, starting with the first data level organized at block 1402, the data formatter determines the difference between the current data level and the corresponding data level stored in the tailorable message in the primary buffer 306 (FIG. 3). At block 1408, the data formatter 304 determines what action (e.g., the actions 814 of FIG. 8B) is involved to update the snapshot with the changed data. In some examples, when there is no difference between the current data level and the corresponding data level stored in the tailorable message in the primary buffer 306, no action is generated for that level. At block 1410, the data formatter 304 adds the action determined at block 1408 to the tailorable message (e.g., the tailorable message 810 of FIG. 8B, the tailorable message 1000 of FIG. 10) in the secondary buffer 308. At block 1412, the data formatter 304 determines whether the portion of the deltasnap in the secondary buffer 308 is larger than the snapshot in the primary buffer 306. If deltasnap in the secondary buffer 308 is larger than the snapshot, program control advances to block 1414. Otherwise, if deltasnap in the secondary buffer 308 is not larger than the snapshot, program control advances to block 1416.

At block 1414, generation of a deltasnap is aborted, and the data formatter generates a snapshot instead. Example program 1400 then ends. At block 1416, the data formatter 304 determines if there is another data level to compare to the snapshot. If there is another data level to compare to the snapshot, program control returns to block 1406. Otherwise, if there is not another data level to compare to the snapshot, program control advances to block 1418. At block 1418, the data formatter 304 calculates the location in the secondary buffer 308 of the partitionable point(s) (e.g., the partitionable points 806 of FIG. 8B, the partitionable points 1000 of FIG. 10) of the tailorable message. In some examples, the data formatter 304 create a partition table (e.g., the partition table 1008 of FIG. 10) and appends it to the beginning or the end of the tailorable message in the secondary buffer 308. Example program 1400 then ends.

Figure 15:
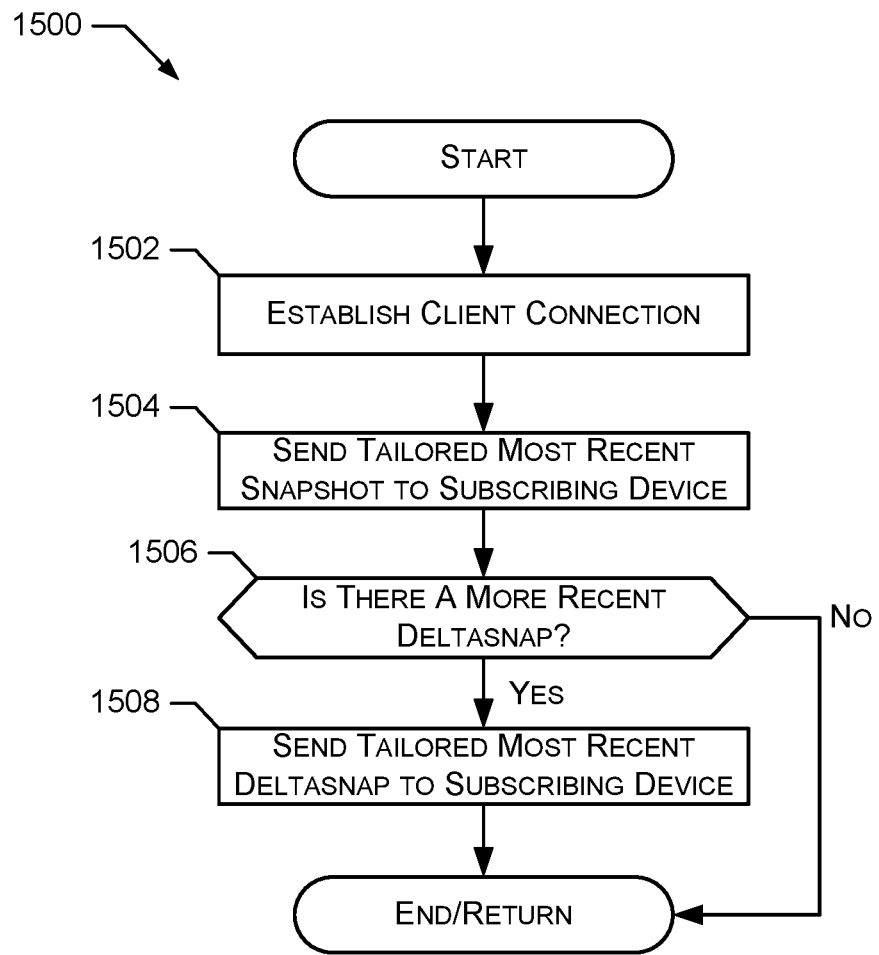
FIG. 15 is a flow diagram of an example method representative of example machine readable instructions which may be executed to implement the message sender of FIG. 3.

FIG. 15 is a flow diagram of an example method 1500 representative of example machine readable instructions which may be executed to implement the example message sender 310 of FIG. 3 to update a recipient (e.g., the receiving device 206 of FIGS. 2 and 3). At block 1502, the message sender 310 establishes a connection (e.g., the first connection 1102*a* of FIG. 11) with the recipient. In some examples, the message sender 310 requests and/or receives preferences from the recipient. Additionally or alternatively, the message sender 310 maintains and/or has access to (e.g., from a subscriber database, etc.) preferences of the recipient. At block 1504, the message sender 310 sends the most recent snapshot (e.g., the snapshot 1106 of FIG. 11) to the recipient. In some examples, the message sender 310 tailors (e.g., uses a portion of the tailorable message in the primary buffer 306 of FIG. 3) the snapshot according to the preferences of the recipient.

At block 1506, the message sender 310 determines if there is a more recent deltasnap (e.g., the deltasnaps 1108a-1108g of FIG. 11) in the secondary buffer 308 (FIG. 3). If the message sender 310 determines if there is a more recent deltasnap, program control advances to block 1508, otherwise, example program 1500 ends. At block 1508, the message sender 310 sends the most recent deltasnap to the recipient. In some examples, the message sender 310 tailors (e.g., uses a portion of the tailorable message in the secondary buffer 306 of FIG. 3) the deltasnap according to the preferences of the recipient. Example program 1500 then ends.

Figure 16:
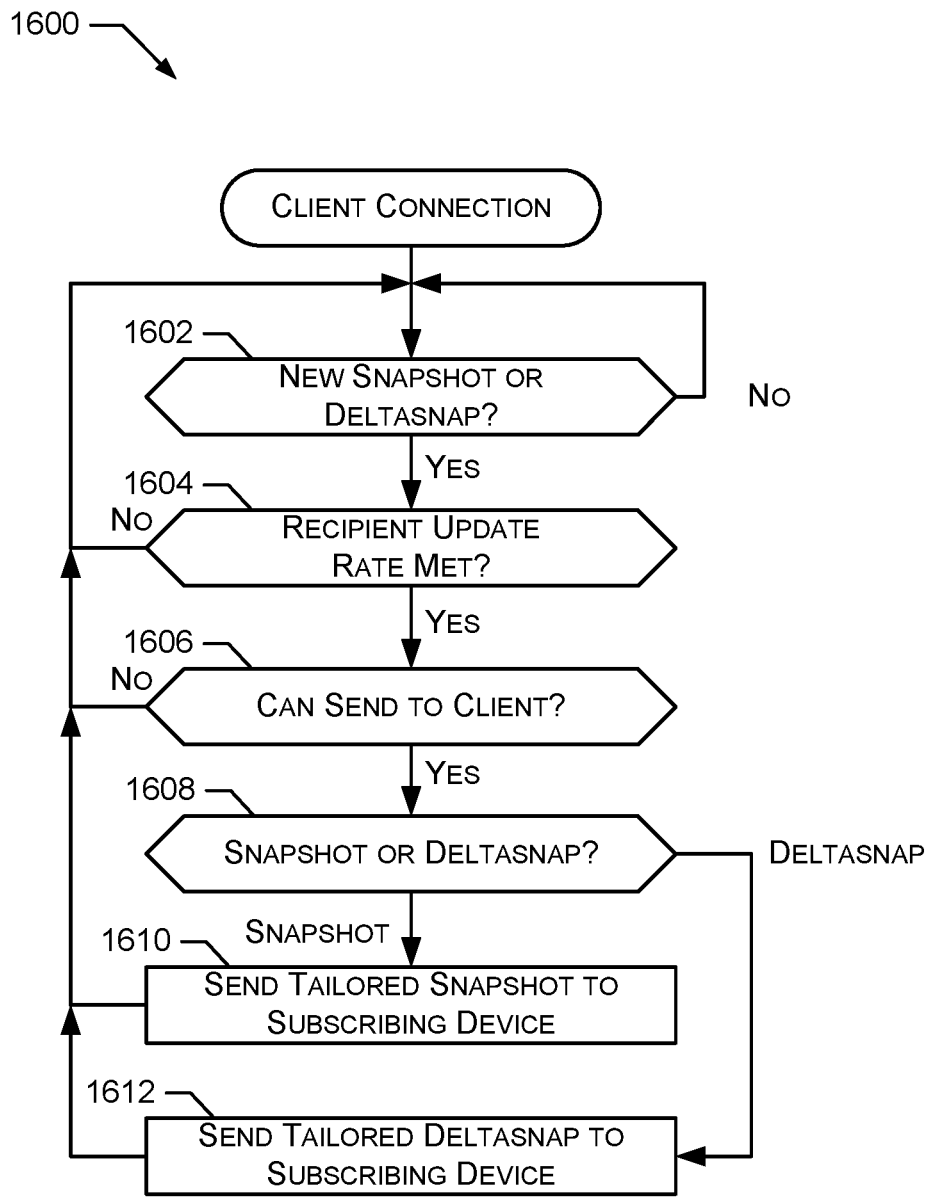
FIG. 16 is a flow diagram of an example method representative of example machine readable instructions which may be executed to implement the message sender of FIG. 3.

FIG. 16 is a flow diagram of an example method 1600 representative of example machine readable instructions which may be executed to implement the message sender 310 of FIG. 3 to send snapshots (e.g., the snapshots 1106 of FIG. 11) and deltasnaps (e.g., the deltasnaps 1108a-1108g of FIG. 11) to receiving devices 206 (FIGS. 2 and 3) connected to the subscription control module 201 of FIGS. 2 and 3. Initially, at block 1602, detects and/or is triggered that a new snapshot in the primary buffer 306 (FIG. 3) or a new deltasnap in the secondary buffer 308 (FIG. 3). If there is a new snapshot or deltasnap, program control advances to block 1604. Otherwise, program control returns to block 1602. At block 1604, the message sender 310 determines if the update rate of the receiving device 206 has been met. In some examples, the recipient sets preferences which are received by the message sender 310 when the connection is established and/or maintained by the message sender 310. In some examples, the receiving device 206 does not set preferences. In such examples, the update rate defaults to the rate the subscription control module 201 generates snapshots and deltasnaps (e.g., the base update rate). If the update rate of the receiving device 206 has been met, program control advances to block 1606. Otherwise, if the update rate of the receiving 206 has not been met, program control returns to block 1602.

At block 1606, the message sender 310 determines if a message can be sent to the receiving device 206. In some examples, the message sender 310 detects congestion (e.g., the period of congestion 1112 of FIG. 3). If a message can be sent to the receiving device 206, program control advances to block 1608. Otherwise, if a message cannot be sent to the receiving device 206, program control returns to block 1602. At block 1608, the message sender 310 determines whether a snapshot or a deltasnap is to be sent to the receiving device 206. If a snapshot is to be sent, program control advances to block 1610. If a deltasnap is to be sent, program control advances to block 1612. At block 1610, the message sender 310 sends the snapshot to the receiving device 206. In some examples, the message sender 310 tailors (e.g., uses a portion of the tailorable message in the primary buffer 306 of FIG. 3) the snapshot according to the preferences of the recipient. Program control returns to block 1602. At block 1612, the message sender 310 sends the deltasnap to the recipient. In some examples, the message sender 310 tailors (e.g., uses a portion of the tailorable message in the secondary buffer 306 of FIG. 3) the deltasnap according to the preferences of the recipient. Program control returns to block 1602. Example instructions 1600 are executed until the recipient disconnects from the subscription control module 201.

Figure 17:
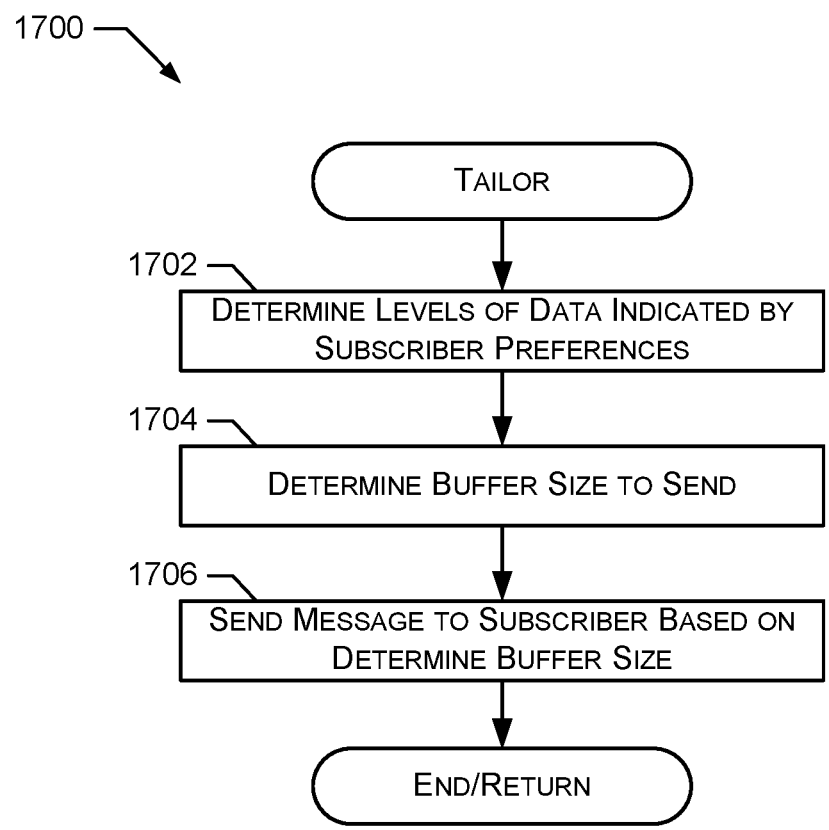
FIG. 17 is a flow diagram of an example method representative of example machine readable instructions which may be executed to implement the message sender of FIG. 3.

FIG. 17 is a flow diagram of an example method 1700 representative of example machine readable instructions which may be executed to implement the message sender 310 of FIG. 3 to tailor snapshots (e.g., the snapshots 1106 of FIG. 11) and/or deltasnaps (e.g., the deltasnaps 1108a-1108g of FIG. 11) without remarshaling the tailorable messages (e.g., the tailorable message 800 of FIG. 8A, the tailorable message 810 of FIG. 8B, etc.) in the buffer (e.g., the primary buffer 306 and/or the secondary buffer 308 of FIG. 3). Initially, at block 1702, the message sender 310 determines levels of data (e.g. the data levels 702a-702f of FIGS. 7A and 7B) to send as indicated by recipient preferences. At block 1704, the message sender 310 determines the size of the portion of the buffer to send to the receiving device 206 based on the number of data levels determined at block 1702. In some examples, a partition table (e.g., the partition table 1008 of FIG. 10) is appended to the beginning or the end of the buffer. In such examples, the message sender 310 looks up the required buffer size on the partition table 1008. At block 1706, the message sender 310 sends the portion of the buffer determined at block 1704 to the receiving device 206. Example program 1700 then ends.

VIII. Example Electronic Trading System

Certain embodiments discussed above may be useful in electronic trading systems. For example, communicating market information including quantity available at various price levels may benefit from message tailoring. For example, inside market data and market depth data of tradeable objects may be organized into partitionable data levels (e.g., the partitionable data levels 702a-702f). Additionally, updates to the inside market data and the market depth data may be communicated to subscribers to the exchange of those tradeable objects using the deltasnap technique.

Figure 18:
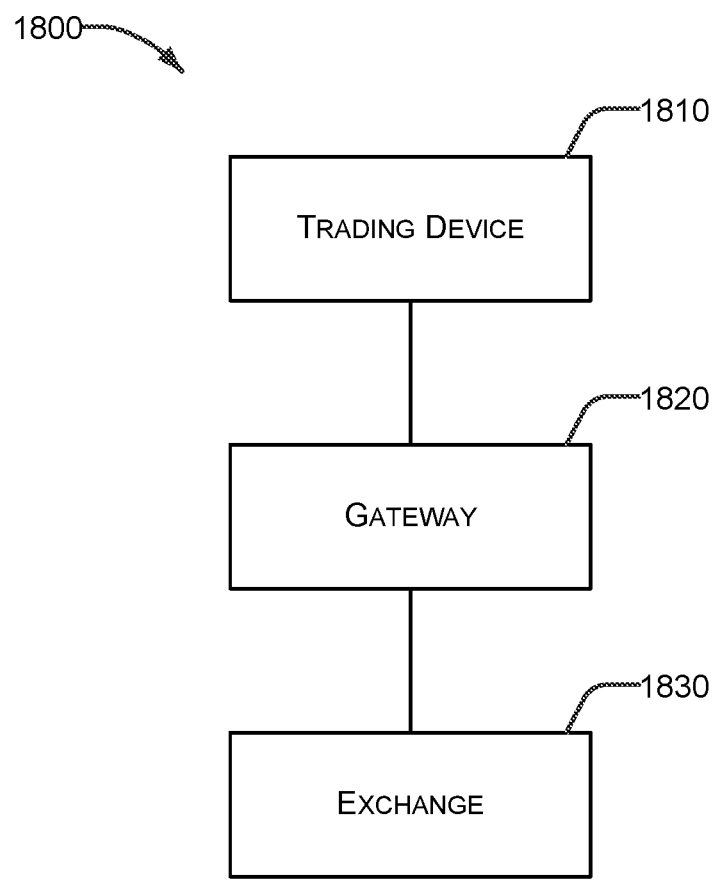
FIG. 18 illustrates a block diagram representative of an example electronic trading system in which certain embodiments may be employed.

FIG. 18 illustrates a block diagram representative of an example electronic trading system 1800 in which certain embodiments may be employed. The system 1800 includes a trading device 1810, a gateway 1820, and an exchange 1830. The trading device 1810 is in communication with the gateway 1820. The gateway 1820 is in communication with the exchange 130. As used herein, the phrase "in communication with" encompasses direct communication and/or indirect communication through one or more intermediary components. The trading device 1810, the gateway 1820 and/or the exchange 1830 may include one or more computing devices 100 of FIG. 1. The exemplary electronic trading system 1800 depicted in FIG. 18 may be in communication with additional components, subsystems, and elements to provide additional functionality and capabilities without departing from the teaching and disclosure provided herein.

In operation, the trading device 1810 may receive market data from the exchange 1830 through the gateway 1820. A user may utilize the trading device 110 to monitor this market data and/or base a decision to send an order message to buy or sell one or more tradeable objects to the exchange 1830.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 1810 may include one or more electronic computing platforms. For example, the trading device 1810 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 1810 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 1810 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 1810.

The trading device 1810 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 1810 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 1810 from another computer readable medium. For example, the trading application (or updates to the trading application) may be stored by a manufacturer, developer, or publisher on one or more CDs or DVDs, which are then loaded onto the trading device 1810 or to a server from which the trading device 1810 retrieves the trading application. As another example, the trading device 1810 may receive the trading application (or updates to the trading application) from a server, for example, via the Internet or an internal network. The trading device 1810 may receive the trading application or updates when requested by the trading device 1810 (for example, "pull distribution") and/or unrequested by the trading device 110 (for example, "push distribution").

The trading device 1810 may be adapted to send order messages. For example, the order messages may be sent to through the gateway 1820 to the exchange 1830. As another example, the trading device 1810 may be adapted to send order messages to a simulated exchange in a simulation environment which does not effectuate real-world trades.

The order messages may be sent at the request of a user. For example, a trader may utilize the trading device 1810 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 1830 through the gateway 1820. The trading device 1810 may communicate with the gateway 1820 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 1820 may include one or more electronic computing platforms. For example, the gateway 1820 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 1820 may facilitate communication. For example, the gateway 1820 may perform protocol translation for data communicated between the trading device 1810 and the exchange 1830. The gateway 1820 may process an order message received from the trading device 1810 into a data format understood by the exchange 1830, for example. Similarly, the gateway 1280 may transform market data in an exchange-specific format received from the exchange 1830 into a format understood by the trading device 1810, for example.

The gateway 1820 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 1820 communicates with the exchange 1830 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 1830 may be owned, operated, controlled, or used by an exchange entity. Example exchange entities include the CME Group, the London International Financial Futures and Options Exchange, the Intercontinental Exchange, and Eurex. The exchange 1830 may include an electronic matching system, such as a computer, server, or other computing device, which is adapted to allow tradeable objects, for example, offered for trading by the exchange, to be bought and sold. The exchange 1830 may include separate entities, some of which list and/or administer tradeable objects and others which receive and match orders, for example. The exchange 1830 may include an electronic communication network ("ECN"), for example.

The exchange 1830 may be an electronic exchange. The exchange 1830 is adapted to receive order messages and match contra-side trade orders to buy and sell tradeable objects. Unmatched trade orders may be listed for trading by the exchange 1830. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 1810 or other devices in communication with the exchange 130, for example. For example, typically the exchange 1830 will be in communication with a variety of other trading devices (which may be similar to trading device 1810) which also provide trade orders to be matched.

The exchange 1830 is adapted to provide market data. Market data may be provided in one or more messages or data packets or through a shared memory system. For example, the exchange 1830 may publish a data feed to subscribing devices, such as the trading device 1810 or gateway 1820. The data feed may include market data.

The system 1800 may include additional, different, or fewer components. For example, the system 1800 may include multiple trading devices, gateways, and/or exchanges. In another example, the system 1800 may include other communication devices, such as middleware, firewalls, hubs, switches, routers, servers, exchange-specific communication equipment, modems, security managers, and/or encryption/decryption devices.

IX. Expanded Example Electronic Trading System

Figure 19:
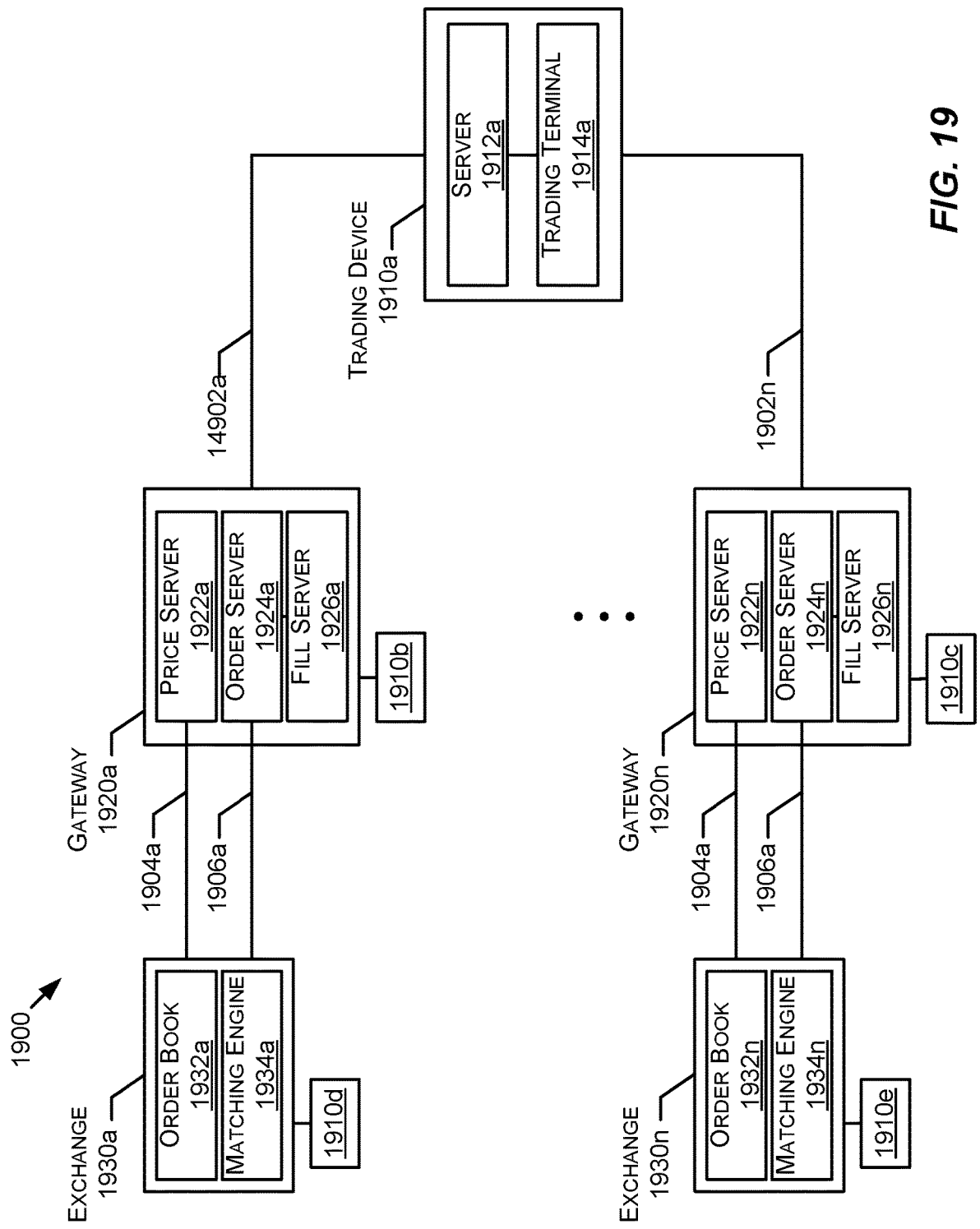
FIG. 19 illustrates a block diagram of another example electronic trading system in which certain embodiments may be employed.

FIG. 19 illustrates a block diagram of another example electronic trading system 1900 in which certain embodiments may be employed. In this example, a trading device 1910 may utilize one or more communication networks to communicate with a gateway 1920 and exchange 1930. For example, the trading device 1910 utilizes network 1902 to communicate with the gateway 1920, and the gateway 1920, in turn, utilizes the networks 1904 and 1906 to communicate with the exchange 1930. As used herein, a network facilitates or enables communication between computing devices such as the trading device 1910, the gateway 1920, and the exchange 1930.

The following discussion generally focuses on the trading device 1910, gateway 1920, and the exchange 1930. However, the trading device 1910 may also be connected to and communicate with "n" additional gateways (individually identified as gateways 1920a-1920n, which may be similar to gateway 1920) and "n" additional exchanges (individually identified as exchanges 1930a-1930n, which may be similar to exchange 1930) by way of the network 1902 (or other similar networks). Additional networks (individually identified as networks 1904a-1904n and 1906a-1906n, which may be similar to networks 1904 and 1906, respectively) may be utilized for communications between the additional gateways and exchanges. The communication between the trading device 1910 and each of the additional exchanges 1930a-1930n need not be the same as the communication between the trading device 1910 and exchange 1930. Generally, each exchange has its own preferred techniques and/or formats for communicating with a trading device, a gateway, the user, or another exchange. It should be understood that there is not necessarily a one-to-one mapping between gateways 1920a-1920n and exchanges 1930a-1930n. For example, a particular gateway may be in communication with more than one exchange. As another example, more than one gateway may be in communication with the same exchange. Such an arrangement may, for example, allow one or more trading devices 1910 to trade at more than one exchange (and/or provide redundant connections to multiple exchanges).

Additional trading devices 1910a-1910n, which may be similar to trading device 1910, may be connected to one or more of the gateways 1920a-1920n and exchanges 1930a-1930n. For example, the trading device 1910a may communicate with the exchange 1930a via the gateway 1920a and the networks 1902a, 1904a and 1906a. In another example, the trading device 1910b may be in direct communication with exchange 1930a. In another example, trading device 1910c may be in communication with the gateway 1920n via an intermediate device 1908 such as a proxy, remote host, or WAN router.

The trading device 1910, which may be similar to the trading device 110 in FIG. 1, includes a server 1912 in communication with a trading terminal 1914. The server 1912 may be located geographically closer to the gateway 1920 than the trading terminal 1914 in order to reduce latency. In operation, the trading terminal 1914 may provide a trading screen to a user and communicate commands to the server 1912 for further processing. For example, a trading algorithm may be deployed to the server 1912 for execution based on market data. The server 1912 may execute the trading algorithm without further input from the user. In another example, the server 1912 may include a trading application providing automated trading tools and communicate back to the trading terminal 1914. The trading device 1910 may include additional, different, or fewer components.

In operation, the network 1902 may be a multicast network configured to allow the trading device 1910 to communicate with the gateway 1920. Data on the network 1902 may be logically separated by subject such as, for example, by prices, orders, or fills. As a result, the server 1912 and trading terminal 1914 can subscribe to and receive data such as, for example, data relating to prices, orders, or fills, depending on their individual needs.

The gateway 1920, which may be similar to the gateway 1820 of FIG. 18, may include a price server 1922, order server 1924, and fill server 1926. The gateway 1920 may include additional, different, or fewer components. The price server 1922 may process price data. Price data includes data related to a market for one or more tradeable objects. The order server 1924 processes order data. Order data is data related to a user's trade orders. For example, order data may include order messages, confirmation messages, or other types of messages. The fill server collects and provides fill data. Fill data includes data relating to one or more fills of trade orders. For example, the fill server 1926 may provide a record of trade orders, which have been routed through the order server 1924, that have and have not been filled. The servers 1922, 1924, and 1926 may run on the same machine or separate machines. There may be more than one instance of the price server 1922, the order server 1924, and/or the fill server 1926 for gateway 1920. In certain embodiments, the additional gateways 1920a-1920n may each includes instances of the servers 1922, 1924, and 1926 (individually identified as servers 1922a-1922n, 1924a-1924n, and 1926a-1926n).

The gateway 1920 may communicate with the exchange 1930 using one or more communication networks. For example, as shown in FIG. 19, there may be two communication networks connecting the gateway 1920 and the exchange 1930. The network 1904 may be used to communicate market data to the price server 1922. In some instances, the exchange 1930 may include this data in a data feed that is published to subscribing devices. The network 1906 may be used to communicate order data to the order server 1924 and the fill server 1926. The network 1906 may also be used to communicate order data from the order server 1924 to the exchange 1930.

The exchange 1930, which may be similar to the exchange 1830 of FIG. 18, includes an order book 1932 and a matching engine 1934. The exchange 1930 may include additional, different, or fewer components. The order book 1932 is a database that includes data relating to unmatched trade orders that have been submitted to the exchange 1930. For example, the order book 1932 may include data relating to a market for a tradeable object, such as the inside market, market depth at various price levels, the last traded price, and the last traded quantity. The matching engine 1934 may match contra-side bids and offers pending in the order book 1932. For example, the matching engine 1934 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 1930a-1930n may each include order books and matching engines (individually identified as the order book 1932a-1932n and the matching engine 1934a-1934n, which may be similar to the order book 1932 and the matching engine 1934, respectively). Different exchanges may use different data structures and algorithms for tracking data related to orders and matching orders.

In operation, the exchange 1930 may provide price data from the order book 1932 to the price server 1922 and order data and/or fill data from the matching engine 1934 to the order server 1924 and/or the fill server 1926. Servers 1922, 1924, 1926 may process and communicate this data to the trading device 1910. The trading device 1910, for example, using a trading application, may process this data. For example, the data may be displayed to a user. In another example, the data may be utilized in a trading algorithm to determine whether a trade order should be submitted to the exchange 1930. The trading device 1910 may prepare and send an order message to the exchange 1930.

In certain embodiments, the gateway 1920 is part of the trading device 1910. For example, the components of the gateway 1920 may be part of the same computing platform as the trading device 1910. As another example, the functionality of the gateway 1920 may be performed by components of the trading device 1910. In certain embodiments, the gateway 1920 is not present. Such an arrangement may occur when the trading device 1910 does not need to utilize the gateway 1920 to communicate with the exchange 1930, such as if the trading device 1910 has been adapted to communicate directly with the exchange 1930.

X. Tailored Messaging with Market Data

The message tailoring techniques described herein may be used to provide market data (e.g., the inside market, market depth, implieds, etc.) received from an exchange (e.g., the exchange 1830 of FIG. 18) to a trading device (e.g., the trading device 1810 of FIG. 18) through a gateway (e.g., the gateway 1820 of FIG. 18) or a server that handles communication between devices and other components of a trading system. For example, a subscription control module (e.g., the subscription control module 201 of FIGS. 2 and 3) may be a component of the gateway 1820 or an edge server to a distributed trading environment. The trading device 1810 reconstructs the current condition of the market for the tradeable object by using the most recently received snapshot as a base, and applying the actions contained in the most recently received deltasnap.

The data source receiver 302 (FIG. 3) of the subscription control module 201 receives or otherwise retrieves the market data from the exchange 1830 for a tradeable object. The data formatter 304 (FIG. 3) then organizes the market data into data levels (e.g., the data levels 702a-702f of FIGS. 7A and 7B). The data levels include the inside market of the tradeable object at the first data level (e.g., including the data for the highest bid and the lowest ask), the first level of market depth at the second data level (e.g., including the second highest bid and/or the second lowest ask), etc. In some examples, the data formatter 304 also organizes the implied market of the tradeable object into data levels.

When the subscription control module 201 is generating a snapshot (e.g., a snapshot 1106 of FIG. 11), the data formatter 304 generates a header (e.g., the header 802 of FIG. 8A) and appends the header to the beginning of the market depth data levels. In some examples, the data formatter appends the implied market data levels after the market depth data levels. In some examples, the data formatter includes the implied market data values with the corresponding market depth data levels. The result is then placed into a primary buffer (e.g., the primary buffer 306 of FIG. 3). In some examples, the data formatter generates a partition table (e.g., the partition table 1008 of FIG. 10) to store in the primary buffer 306 or in a separate memory.

When the subscription control module 201 is generating a deltasnap (e.g., deltasnap 1108a of FIG. 11), the data formatter 304 generates a header and places the header into a secondary buffer (e.g., the secondary buffer 308 of FIG. 3). The data formatter compares market depth levels stored in the primary buffer 306 (which includes the most recently generated snapshot) to the current market data levels and generates actions (e.g., the actions 814 of FIG. 8B) reflecting the differences. The actions 814 are added to the buffer as they are generated. In some examples, after adding an action, the data formatter checks whether the message in the secondary buffer 308 is larger than the message in the primary buffer 306. If the message in the secondary buffer 308 is larger, the data formatter 304 generates a snapshot instead. In some examples, the data formatter 304 also generates actions for the implied market data levels. Additionally, the data formatter generates a partition table 1008 to store in the secondary buffer 308 or in a separate memory.

FIGS. 20A and 20B illustrate example tailorable messages for a snapshot and a deltasnap to provide market data at a number of data levels of market depth. FIG. 20A illustrates an example tailorable snapshot message 2000 to provide market data at a number of data levels of market depth. The tailorable snapshot message 2000 includes a header 2002 and market depth data levels 2018. In some examples, the tailorable snapshot message 2000 also includes implied market data levels 2020. In the illustrated example, the implied market data levels 2020 are interlaced with market depth data levels 2018 (e.g., first market depth, then first implied market depth, second market depth, then second implied market depth, etc.). Interlacing allows truncating of implied market data levels 2020 to the same level as the market depth data levels 2018. Interlacing also requires the implied market data levels 2020 being sent with the tailored message 204, even if a particular recipient does not request them. Alternatively, in some examples, the implied market data levels 2020 may be organized at the end of the tailorable snapshot message 2000. In such an example, the market depth data levels 2018 and the implied market data levels 2020 are not separately trauncatable.

In the illustrated example, the header 2002 includes a size parameter 2008, an implied parameter 2010, a ask depth parameter 2012a, a bid depth parameter 2012b, an implied ask depth parameter 2014a, and an implied bid depth parameter 2014b. The size parameter 2008 provides the size of the tailorable snapshot message 2000 in a buffer (e.g., the primary buffer 306, the secondary buffer 308, etc.). In some examples in which a partition table 1008 is appended to the end of the tailorable snapshot message 2000, the size parameter 2008 may be used to determine the beginning to the partition table 1008.

In the example illustrated in FIG. 20A, the implied parameter 2010 indicates whether implied market data levels 2020 are included in the tailorable snapshot message 2000. The example ask depth parameter 2012a indicates the number of the market depth data levels 2018 that include ask levels 2017a in the tailorable snapshot message 2000. The example bid depth parameter 2012b indicates the number of the market depth data levels 2018 that include bid levels 2017b in the tailorable snapshot message 2000. In some examples, the ask depth parameter 2012a and the bid depth parameter are not equal. For example, the market for the tradeable object may be asymmetric with more bids levels 2017b than ask levels 2017a (or vice versa). The implied ask depth parameter 2014a indicates the number of the implied market data levels 2020 that include ask levels 2017a in included in the tailorable snapshot message 2000. The implied bid depth parameter 2014b indicates the number of the implied market data levels 2020 that include bid levels 2017b in included in the tailorable snapshot message 2000. In some examples in which the implied parameter 2010 indicates that the implied market data levels 2020 are not included in the tailorable snapshot message 2000, the implied ask depth parameter 2014a and the implied bid depth parameter 2014b are not included in the header 2002.

In the illustrated example of FIG. 20A, the depth data levels 2018 may include a price and a quantity (also referred to as a size) for a bid level 2017a and/or a price and a quantity (also referred to as a size) of an ask level 2027a (e.g., the market depths may not be symmetrical, where there may be more levels of asks than bids and vice versa). For example, a first depth data level 2018 may have both an ask level 2017b and a bid level 2017b, while, because the market for the tradeable object is asymmetrical, a second depth data level 2018 may only include an ask level 2017a. For efficiency, depth data levels 2018 after the first depth data level may include a price offset (e.g., the price for the bid/ask level is relative to the price included in the previous depth data level 2018), such as ask offset 2019a and bid offset 2019c, and a quantity (also referred to as a size), such as ask size 2019b and bid size 2019d. Because a price value may be represented by a 64-bit (8 byte) value, using an 8-bit (1 byte) relative offset to identify subsequent price values can result in a reduction in the amount of data that needs to be sent.

In the illustrated example, the example implied depth data levels 2020 include a price and a size for a depth of the implied market. Additionally or alternatively, the implied depth data levels 2020 may include a size and a price offset (e.g., the price is relative to the price included in the previous implied depth data level 2020) similar to that discussed above for the depth data levels 2018. The message sender 310 (FIG. 3) of the subscription control module 201 may establish a connection (e.g., the first connection 1102a of FIG. 11, the second connection 1102b of the FIG. 11, etc.) with an receiving device (e.g., the trading device 1810) of a subscriber to a market for a particular tradeable object. The message sender 310 may receive preferences from the trading device 1810. Example preference(s) include how many level(s) of the market depth to receive, and/or a preferred transmission rate (e.g., how often to send a deltasnap). In some examples, when the implied market data levels 2020 are not interlaced with the market depth data levels 2018, if the receiving device 206 sets a preference for any level(s) of the implied market, the receiving device 206 also receives all levels of the market depth.

To send a tailored snapshot message (e.g., the tailored message 204 of FIG. 2) to a trading device 1810, the message sender 310 uses a portion of the tailorable snapshot message 2000 from the primary buffer 306. In some examples, the message sender looks up the portion of the tailorable snapshot message 2000 to use on the partition table 1008. The message sender 310 then sends the tailored message 204 to the trading device 1810.

In some examples, to determine the amount to truncate the tailorable snapshot message 2000 to achieve the recipient's preferred number of levels, the message sender 310 calculates the number of bytes of the primary buffer 306 to send to the trading device 1810. In some such examples, the number of bytes to send is calculated in accordance with Equation (4), Equation (5), and Equation (6).

$$B_L = (MD_1 + AB_B \times n) \times 2(1 + I), \quad \text{Equation (4)}$$

where $B_L$ is the upper-bound on the length in bytes of the tailorable message in the buffer to be sent, $MD_1$ is the size in bytes of the difference between the size of first market depth data level 2018 and subsequent market depth data levels 2018 when the subsequent market depth data levels utilize a price offset, $AB_B$ is the size in bytes of subsequent market depth data levels 2018, n is the number of desired levels of market depth, and I is the implied parameter 2010 (e.g., 0 equals no implied market data, 1 equals implied market date is included).

$$B_R = AB_B \times (\min(0, n-b) + \min(0, n-a) + \min(0, n-ib) + \min(0, n-ia)), \quad \text{Equation (5)}$$

where $B_R$ is a number of bytes to reduce, if any, because of asymmetric bids/asks in the levels, $AB_B$ is the size in bytes of a subsequent (that is, not the first) market depth data level 2018, which may be different from the first market depth data level 2018 if price offsets are used, n is the number of desired levels of market depth, b is the bid depth parameter 2012b, a is the ask depth parameter 2012a, ib is the implied bid depth parameter 2014b, and ia is the implied ask depth parameter 2014a.

$$B_S = B_L B_R, \quad \text{Equation (6)}$$

where $B_S$ is the number of bytes to send of the tailorable levels portion of the tailorable snapshot message 2000. To determine a size of the message from the start of the buffer holding the tailorable snapshot message 2000, including, for example, the header 2002, additional bytes for this header are added to $B_S$ to determine the total number of bytes to send. The message sender 310 then sends the tailored message 204 that includes the calculated number of bytes from the tailorable snapshot message 2000 to the trading device 1810.

FIG. 20B illustrates an example tailorable deltasnap message 2022 to provide an update to market data at a number of data levels of market depth. The tailorable deltasnap message 2022 includes a header 2002 and market depth data level updates 2026. In some examples, the tailorable deltasnap message 2022 also includes implied market depth update data levels 2028. In the illustrated example, the implied market depth update data levels 2028 are interlaced with the market depth data level updates 2026. Alternatively, the tailorable deltasnap message 2022 maybe organized with the implied market depth update data levels 2028 at the end of the message (e.g., when the implied market depth data levels 2020 are organized at the end of the tailorable snapshot message 2000).

In the illustrated example, the header 2002 includes a size parameter 2008, an implied parameter 2010, an ask depth parameter 2012a, a bid depth parameter 2012b, an implied ask depth parameter 2014a, and an implied bid depth parameter 2014b. The size parameter 2008 provides the size of the tailorable deltasnap message 2022 in a buffer (e.g., the primary buffer 306, the secondary buffer 308, etc.). In some examples in which a partition table 1008 is appended to the end of the tailorable deltasnap message 2022, the size parameter 2008 may be used to determine the beginning to the partition table 1008.

In the example illustrated in FIG. 20B, the implied parameter 2010 indicates whether implied market data level updates 2028 are included in the tailorable deltasnap message 2022. The ask update parameter 2023a indicates the number of the market depth data level updates 2026 that include ask values 2017a in the tailorable deltasnap message 2022. The bid update parameter 2023b indicates the number of the market depth data level updates 2026 that include bid values 2017b in the tailorable deltasnap message 2022. The implied ask update parameter 2024a indicates the number of the implied market data level updates 2028 that include ask values 2017a in the tailorable deltasnap message 2022. The implied bid update parameter 2024b indicates the number of the implied market data level updates 2028 that include bid values 2017b in the tailorable deltasnap message 2022. In some examples in which the implied parameter 2010 indicates that the implied market data level updates 2028 are not included in the tailorable deltasnap message 2022, the implied ask depth parameter 2024a and the implied bid depth parameter 2024b are not included in the header 2002.

In the example illustrated in FIG. 20B, the market depth data level updates 2026 are included in the tailorable deltasnap message 2022 when the ask price, the ask size, the bid price and/or the bid size of the inside market or the respective market depth have changed since the last snapshot. For example, if the inside market is unchanged, the first market depth is unchanged, and the bid size of the second market depth changes, the tailorable deltasnap message 2022 would include a market depth data level updates 2026 for the second market depth. In some examples, the implied market data level updates 2028 are included in the tailorable deltasnap message 2022 when the ask price, the ask size, the bid price and/or the bid size of the respective implied market depth have changed since the last snapshot.

In the illustrated example of FIG. 20B, the market depth data level updates 2026 and/or the implied market depth data level updates 2028 included in the tailorable deltasnap message 2022 include one or more actions 2030. The action 2030 may include an action reference 2032, an index 2034, an offset 2036, a price 2038, and/or a size 2040. The action reference 2032 identified the action to the trading device 1810 is to preform to implement the respective update. The index 2034 identifies the data level on which the action is to be performed. The offset 2036 identifies the amount by which the specified value is to change. For example, for a modify price action, the offset 2036 identifies the amount that the price is to be adjusted. The price 2038 identifies the value to which the price of the data level is to be set. The size 2040 identifies the value to which the size of the data level is to be set. Example action references 2030 are described on Table (2).

TABLE 2

| Action Reference | Abbreviation | Description | Parameters |
|---|---|---|---|
| Add | A | Add a new data level before an index. | Ask Size, Ask Price or Offset, Bid Size, Bid Price or Offset |
| Add Relative | AR | Add a new data level after an index based on the data level at the index and modified by the parameter(s). | Ask Size, Ask Price or Offset, Bid Size, Bid Price or Offset |
| Add Top | AT | Add a new data level before the first data level (no index). | Ask Size, Ask Price or Offset, Bid Size, Bid Price or Offset |
| Modify Size | MS | Modify size of the data level identified by an index. | Ask Size Offset, Bid SizeOffset |
| Modify Price | MP | Modify price of the data level identified by an index. | Ask Price Offset, Bid Price Offset |
| Modify Both | MB | Modify price and size of the data level identified by an index. | Ask Price Offset, Bid Price Offset, Ask Size Offset, Bid Size Offset |
| Delete | D | Delete data level identified by an index. | |
| No Change | NC | Indicate that data level identified by an index has not changed | Ask Size, Ask Price or Offset, Bid Size, Bid Price or Offset |

To send a tailored deltasnap message (e.g., the tailored message 204 of FIG. 2) to a trading device 1810, the message sender 310 uses a portion of the tailorable deltasnap message 2022 from the secondary buffer 308. In some examples, the message sender looks up the portion of the tailorable deltasnap message 2022 to use in the partition table 1008. The message sender 310 then sends the tailored message 204 to the trading device 1810.

In some examples, to truncate the tailorable deltasnap message 2022, the message sender 310 calculates the number of bytes of the secondary buffer 308 to send to the trading device 1810. To calculate the number of bytes, market depth data level updates 2026 and the implied market depth data level updates 2028 are traversed to determine a calculated position in the secondary buffer 308. A number of action references 2032 with "delete" actions (D) are counted and the number of action references 2932 with add actions (e.g., "add," "add top," add relative") (A) are counted for actions 2030 with index 2034 up to the depth limit (N) set by the receiving device's 206 preferences. The actions 2030 in the secondary buffer 308 are traversed up to the end of the last action 2030 corresponding to the N+D−A index. This location is the calculated position. The message sender 310 then sends the tailored message 204 that includes the number of bytes indicated by the calculated position from the tailorable deltasnap message 2022 to the trading device 1810.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system including:
a computing device,
wherein the computing device is configured to generate a first snapshot message representing a state of a data source at a first time, wherein the first snapshot message is organized into a plurality of data levels, wherein each data level corresponds to a level of detail of the state of the data source at the first time, wherein each data level is associated with a first value based on the state of the data source at the first time;
wherein the computing device is configured to send the first snapshot message to a first recipient device;
wherein the computing device is configured to generate a first deltasnap message representing a difference between the state of the data source at a second time and the state of the data source at the first time, wherein the first deltasnap message identifies (i) data levels of the plurality of data levels in the first snapshot message where the associated first value is different between the state of the data source at the second time and the state of the data source at the first time and (ii) the corresponding difference in the associated first value;

wherein the computing device is configured to send the first deltasnap message to the first recipient device;

wherein the computing device is configured to generate a second deltasnap message representing a difference between the state of the data source at a third time and the state of the data source at the first time, wherein the second deltasnap message identifies (i) data levels of the plurality of data levels in the first snapshot message where the associated first value is different between the state of the data source at the third time and the state of the data source at the first time and (ii) the corresponding difference in the associated first value; and wherein the computing device is configured to send the second deltasnap message to the first recipient device.

2. The system of claim 1, wherein the first deltasnap message includes one or more actions instructing the first recipient device to modify the state represented by the first snapshot message to reflect the state of the data source at the second time.

3. The system of claim 1, wherein the plurality of data levels are organized in descending order of interest.

4. The system of claim 1, wherein the first deltasnap message is organized into the plurality of data levels, the first deltasnap message including one or more actions for each of the respective data levels, the actions instructing the first recipient device to modify the state represented by the respective data level of the first snapshot message to reflect the state of the data source at the second time.

5. The system of claim 1, wherein the computing device is configured to, before sending the first deltasnap message to the first recipient device, determine whether a difference between the first time and the second time is greater than an update interval specified by the first recipient device; and wherein the computing device is configured to, if the difference between the first time and the second time is greater than the update interval, send the first deltasnap message to the first recipient device.

6. The system of claim 1, wherein the data source is a market for a tradeable object and the first recipient device is a first electronic trading device.

7. The system of claim 1, wherein the computing device is configured to send the first snapshot message to a second recipient device; and wherein the computing device is configured to send the second deltasnap message to the second recipient device, wherein the first deltasnap message is not sent to the second recipient device.

8. The system of claim 1, wherein each data level is associated with a second value based on the state of the data source.

* * * * *